US011652704B2

(12) United States Patent
A

(10) Patent No.: US 11,652,704 B2
(45) Date of Patent: *May 16, 2023

(54) MODEL DRIVEN INTENT POLICY CONFLICT DETECTION AND RESOLUTION THROUGH GRAPH ANALYSIS

(71) Applicant: Juniper Networks, Inc., Sunnyvale, CA (US)

(72) Inventor: Chandrasekhar A, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/652,458

(22) Filed: Feb. 24, 2022

(65) Prior Publication Data

US 2022/0393953 A1 Dec. 8, 2022

Related U.S. Application Data

(63) Continuation of application No. 16/949,242, filed on Oct. 21, 2020, now Pat. No. 11,283,691.

(51) Int. Cl.
*H04L 41/00* (2022.01)
*G06F 16/22* (2019.01)
(Continued)

(52) U.S. Cl.
CPC .......... *H04L 41/24* (2013.01); *G06F 16/2246* (2019.01); *H04L 41/0803* (2013.01);
(Continued)

(58) Field of Classification Search
CPC ............. G06F 16/2246; H04L 41/0803; H04L 41/0866; H04L 41/0873; H04L 41/0893;
(Continued)

(56) References Cited

U.S. PATENT DOCUMENTS 7,636,771 B2 12/2009 Torii
7,870,238 B2 1/2011 Pusateri et al.
(Continued)

FOREIGN PATENT DOCUMENTS

EP 3522452 A1 8/2019
EP 3700132 A1 8/2020
(Continued)

OTHER PUBLICATIONS

"Zero-touch network and Service Management (ZSM); Means of Automation," ETSI GR ZSM 005: v1.1.1, May 2020, 70 pp.
(Continued)

*Primary Examiner* — George C Neurauter, Jr.
(74) *Attorney, Agent, or Firm* — Shumaker & Sieffert, P.A.

(57) ABSTRACT

A method includes maintaining, by a controller device that manages a plurality of network devices, a data structure and receiving, by the controller device, an indication of a stateful intent. The method further includes generating, by the controller device, a logical packet based on the stateful intent and determining, by the controller device, a dependent intent of the data structure based on the logical packet. The method further includes determining that the dependent intent conflicts with the stateful intent. The method further includes, in response to determining that the dependent intent conflicts with the stateful intent, determining, by the controller device, a resolution that resolves the conflict between the dependent intent and the stateful intent based on the dependent intent and the stateful intent and outputting, by the controller device, an indication of the resolution.

20 Claims, 12 Drawing Sheets

(51) Int. Cl.
*H04L 41/0803* (2022.01)
*H04L 41/0866* (2022.01)
*H04L 41/0873* (2022.01)
*H04L 41/0893* (2022.01)
*H04L 41/14* (2022.01)
*H04L 9/40* (2022.01)
*H04L 69/22* (2022.01)

(52) U.S. Cl.
CPC ...... *H04L 41/0866* (2013.01); *H04L 41/0873* (2013.01); *H04L 41/0893* (2013.01); *H04L 41/145* (2013.01); *H04L 63/02* (2013.01); *H04L 69/22* (2013.01)

(58) Field of Classification Search
CPC ....... H04L 41/145; H04L 41/24; H04L 63/02; H04L 69/22
See application file for complete search history.

(56) References Cited

U.S. PATENT DOCUMENTS

| | | |
|---|---|---|
| 8,156,207 B2 | 4/2012 | Wood et al. |
| 8,327,414 B2 | 12/2012 | Strassner et al. |
| 8,386,593 B1 | 2/2013 | Gao et al. |
| 8,737,993 B2 | 5/2014 | Alves et al. |
| 8,782,182 B2 | 7/2014 | Chaturvedi et al. |
| 8,819,202 B1 | 8/2014 | Carolan et al. |
| 8,849,973 B2 | 9/2014 | Leib et al. |
| 8,869,236 B1 | 10/2014 | Tonogai et al. |
| 9,037,969 B2 | 5/2015 | Wolff-Petersen et al. |
| 9,098,707 B2 | 8/2015 | Borghetti et al. |
| 9,298,928 B2 | 3/2016 | Borghetti et al. |
| 10,063,428 B1 | 8/2018 | Karam et al. |
| 10,277,461 B1 | 4/2019 | A et al. |
| 10,313,206 B1 | 6/2019 | Karam et al. |
| 10,333,776 B2 | 6/2019 | Karam et al. |
| 10,374,872 B2 | 8/2019 | Ratkovic et al. |
| 10,374,886 B1 | 8/2019 | A et al. |
| 10,389,573 B2 | 8/2019 | Karam et al. |
| 10,439,875 B2 | 10/2019 | Mohanram |
| 10,505,816 B2 | 12/2019 | Mohanram et al. |
| 10,516,761 B1 | 12/2019 | A et al. |
| 10,558,542 B1 | 2/2020 | A et al. |
| 10,567,384 B2 | 2/2020 | Kang et al. |
| 10,581,694 B2 | 3/2020 | Mohanram |
| 10,630,540 B2 | 4/2020 | Karam et al. |
| 10,693,738 B2 | 6/2020 | Nagarajan et al. |
| 10,698,714 B2 | 6/2020 | Krishnamurthy et al. |
| 10,756,983 B2 | 8/2020 | Ratkovic et al. |
| 10,771,342 B2 | 9/2020 | Kang et al. |
| 10,826,770 B2 | 11/2020 | Sethi et al. |
| 10,938,667 B2 | 3/2021 | Sharma et al. |
| 10,951,477 B2 | 3/2021 | Mohanram |
| 10,992,520 B2 | 4/2021 | Lee et al. |
| 10,992,543 B1 | 4/2021 | Rachamadugu et al. |
| 11,086,709 B1 | 8/2021 | Ratkovic et al. |
| 2002/0112053 A1 | 8/2002 | Christensen et al. |
| 2002/0178246 A1 | 11/2002 | Mayer |
| 2002/0178380 A1 | 11/2002 | Wolf et al. |
| 2004/0059812 A1 | 3/2004 | Assa |
| 2005/0091068 A1 | 4/2005 | Ramamoorthy |
| 2006/0080425 A1 | 4/2006 | Wood et al. |
| 2006/0241931 A1 | 10/2006 | Abu el Ata et al. |
| 2007/0130192 A1 | 6/2007 | Bolder et al. |
| 2007/0150561 A1 | 6/2007 | Courtney |
| 2009/0059814 A1 | 3/2009 | Nixon et al. |
| 2009/0171731 A1 | 7/2009 | Bobak et al. |
| 2009/0198797 A1 | 8/2009 | Wang et al. |
| 2009/0282129 A9 | 11/2009 | Tindal |
| 2010/0293364 A1 | 11/2010 | Maini |
| 2010/0306275 A1 | 12/2010 | Maheshwari et al. |
| 2013/0060929 A1 | 3/2013 | Koponen et al. |
| 2014/0096249 A1 | 4/2014 | Dupont et al. |
| 2014/0200858 A1 | 7/2014 | Chatow et al. |
| 2015/0015376 A1 | 1/2015 | Jenkins |
| 2015/0188774 A1 | 7/2015 | Nadaf et al. |
| 2015/0248487 A1 | 9/2015 | Baranowski et al. |
| 2015/0379409 A1 | 12/2015 | Hu et al. |
| 2016/0188767 A1 | 6/2016 | Razin |
| 2016/0342510 A1 | 11/2016 | Pani |
| 2016/0344772 A1 | 11/2016 | Monahan et al. |
| 2017/0109907 A1 | 4/2017 | Hamedani |
| 2017/0250881 A1 | 8/2017 | Kellicker |
| 2017/0331828 A1 | 11/2017 | Caldera et al. |
| 2018/0137155 A1 | 5/2018 | Majumdar |
| 2018/0210927 A1 | 7/2018 | Karam et al. |
| 2018/0316576 A1 | 11/2018 | Kang et al. |
| 2019/0182119 A1 | 6/2019 | Ratkovic et al. |
| 2019/0238410 A1 | 8/2019 | Kang et al. |
| 2019/0238423 A1 | 8/2019 | Karam et al. |
| 2019/0306015 A1 | 10/2019 | Ratkovic et al. |
| 2019/0319830 A1 | 10/2019 | Karam et al. |
| 2020/0007495 A1 | 1/2020 | Balamurugan et al. |
| 2020/0136917 A1 | 4/2020 | Kang et al. |
| 2020/0213189 A1 | 7/2020 | Karam et al. |
| 2020/0328949 A1 | 10/2020 | Ratkovic et al. |

FOREIGN PATENT DOCUMENTS

| | | |
|---|---|---|
| WO | 2007140337 A2 | 12/2007 |
| WO | 2017204872 A1 | 11/2017 |

OTHER PUBLICATIONS

Abhashkumar et al. "Supporting Diverse Dynamic Intent-based Policies using Janus," CoNEXT '17: Proceedings of the 13th International Conference on emerging Networking Experiments and Technologies, Incheon, Republic of Korea, Dec. 12-15, 2017, pp. 296-309.

Beckett et al. "Don't Mind the Gap: Bridging Network-wide Objectives and Device-level Configurations," SIGCOMM 16, Aug. 22-26, 2016, Florianopolis, Brazil, pp. 328-341.

Bjorklund, "YANG—A Data Modeling Language for the Network Configuration Protocol (NETCONF)," Internet Engineering Task Force (IETF), RFC 6020, Oct. 2010, 174 pp.

Enns et al., "Network Configuration Protocol (NETCONF)," Internet Engineering Task Force (IETF),RFC 6241, Jun. 2011, 114 pp.

Enns, "NETCONF Configuration Protocol," Network Working Group, RFC 4741, Dec. 2006, 96 pp.

Extended Search Report from counterpart European Application No. 21151008.6, dated Jun. 23, 2021, 11 pp.

Final Office Action from U.S. Appl. No. 16/916,783, dated Jan. 5, 2022, 11 pp.

Harrington et al., "An Architecture for Describing Simple Network Management Protocol (SNMP) Management Frameworks," Network Working Group, RFC 3411, Dec. 2002, 65 pp.

Nagendra et al. "VISCR: Intuitive & Conflict-free Automation for Securing the Dynamic Consumer IoT infrastructures," arXIV:1907.13288v1, Jul. 31, 2019, 16 pp.

Notice of Allowance from U.S. Appl. No. 16/949,242, dated Nov. 18, 2021, 10 pp.

Prakash et al., "PGA: Using Graphs to Express and Automatically Reconcile Network Policies," SIGCOMM 2015, Aug. 17-21, 2015, London, United Kingdom, 14 pp.

Prosecution History from U.S. Appl. No. 16/949,242, dated Nov. 8, 2021 through Nov. 18, 2021, 11 pp.

U.S. Appl. No. 16/360,660, filed Mar. 21, 2019, naming inventors Rachamadugu et al.

U.S. Appl. No. 16/400,936, filed May 1, 2019, naming inventors Ratkovic et al.

U.S. Appl. No. 16/949,242, filed Oct. 21, 2020, naming inventors A et al.

U.S. Appl. No. 17/104,804, filed Nov. 25, 2020, naming inventors Hafeez et al.

U.S. Appl. No. 16/551,532, filed Aug. 26, 2019, entitled "Programmable Configlets Through Paque Intents in Graph Based Intent Controllers".

(56) References Cited

OTHER PUBLICATIONS

Response to Extended Search Report dated Apr. 27, 2022, from counterpart European Application No. 21151008.6 filed Oct. 27, 2022, 32 pp.

MODEL DRIVEN INTENT POLICY CONFLICT DETECTION AND RESOLUTION THROUGH GRAPH ANALYSIS

This application is a continuation of U.S. patent application Ser. No. 16/949,242, filed 21 Oct. 2020, the entire contents of which is incorporated herein by reference.

TECHNICAL FIELD

This disclosure relates to computer networks, and more particularly, to management of network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system allows administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across business computing architecture. For example, data models may be represented using data structures such as, for example, connected graphs having vertices connected with has-edges and reference (ref) edges. Controller devices may model intent data models as unified graphs. In this manner, business policies can be implemented across intent data models. When intents are modeled using a unified graph model, extending new intent support may extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to the device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators may include the translation or mapping logic from the high-level intent data model to the low-level device configuration model. In some instances, a relatively small number of changes in the intent data model may impact a relatively large number of properties across device configurations. Different translators may be used when services are created, updated, and deleted from the intent data model.

SUMMARY

In general, this disclosure describes techniques to detect a conflict between intents and to provide a resolution to the conflict. For example, a controller device may determine a dependent intent of a data structure (e.g., a graph model) is in conflict with a stateful intent before the stateful intent is translated into a device-level configuration. In this example, the controller device may determine a resolution that resolves the conflict between the stateful intent and the dependent intent. In this way, the controller device may resolve conflicts at the intent level instead of in the device-level configuration, which may allow for improved scalability compared to systems that resolve conflicts at a device-level.

Techniques described herein may allow for the controller device to automatically perform validations to help to ensure that there are no conflicts between different and intents. For example, rather than an intent overriding existing intents, the controller device may identify a conflict and generate a resolution that resolves the conflict while potentially satisfying the intent and existing intents.

In one example, this disclosure describes a method that includes maintaining, by a controller device that manages a plurality of network devices, a data structure that includes a plurality of vertices and a plurality of edges, each vertex of the plurality of vertices representing a respective network device of the plurality of network devices or a respective stateless intent of a plurality of stateless intents, and the plurality of edges defining relationships between the plurality of vertices; receiving, by the controller device, an indication of a stateful intent, the stateful intent specifying an intended state to be translated into one or more device-level configuration changes for the plurality of network devices; generating, by the controller device, a logical packet based on the stateful intent; determining, by the controller device, a dependent intent of the data structure based on the logical packet; determining that the dependent intent conflicts with the stateful intent; and in response to determining that the dependent intent conflicts with the stateful intent: determining, by the controller device, a resolution that resolves the conflict between the dependent intent and the stateful intent based on the dependent intent and the stateful intent; and outputting, by the controller device, an indication of the resolution.

In another example, this disclosure describes a device configured to manage a plurality of network devices and to: maintain a data structure that includes a plurality of vertices and a plurality of edges, each vertex of the plurality of vertices representing a respective network device of the plurality of network devices or a respective stateless intent of a plurality of stateless intents, and the plurality of edges defining relationships between the plurality of vertices; receive an indication of a stateful intent, the stateful intent specifying an intended state to be translated into one or more device-level configuration changes for the plurality of network devices; generate a logical packet based on the stateful intent; determine a dependent intent of the data structure based on the logical packet; determine that the dependent intent conflicts with the stateful intent; and in response to a determination that the dependent intent conflicts with the stateful intent: determine a resolution that resolves the conflict between the dependent intent and the stateful intent based on the dependent intent and the stateful intent; and output an indication of the resolution.

In one example, this disclosure describes a computer-readable storage medium comprising one or more instructions that cause processing circuitry to: maintain a data structure that includes a plurality of vertices and a plurality of edges, each vertex of the plurality of vertices representing a respective network device of a plurality of network devices or a respective stateless intent of a plurality of stateless intents, and the plurality of edges defining relationships between the plurality of vertices; receive an indication of a stateful intent, the stateful intent specifying an intended state to be translated into one or more device-level configuration changes for the plurality of network devices; generate a logical packet based on the stateful intent; determine a dependent intent of the data structure based on the logical packet; determine that the dependent intent conflicts with the stateful intent; and in response to a determination that the dependent intent conflicts with the stateful intent: determine a resolution that resolves the conflict between the dependent intent and the stateful intent based on the dependent intent and the stateful intent; and output an indication of the resolution.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and description.

DETAILED DESCRIPTION

Figure 1:
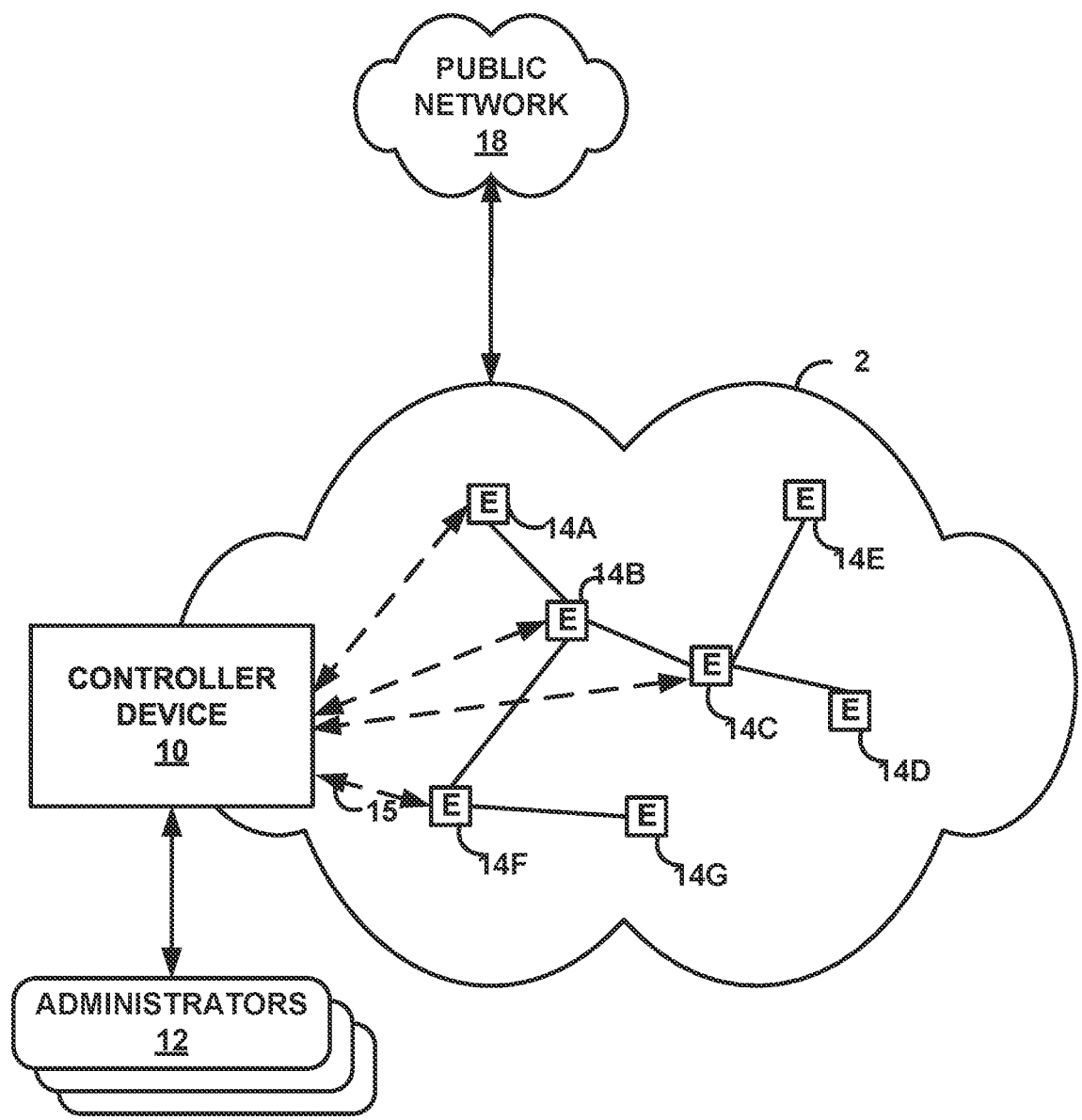
FIG. 1 is a block diagram illustrating an example including network devices of an enterprise network that are upgraded using a controller device, in accordance with the techniques of the disclosure.

This disclosure is directed to controller devices supporting intent based workflows to manage a network. As used herein, intent may refer to a fully declarative way of describing the intended network/compute/storage state. For example, a user (e.g., an administrator) may write translation programs that translate high-level configuration instructions (e.g., instructions according to an intent data model, which may be expressed as a unified graph model) to low-level configuration instructions (e.g., instructions according to a device configuration model) that can be applied to a resource of a network. As used herein, a unified model graph or "unified intent graph" may refer to a graph that includes stateless intents as vertices and endpoints as vertices (also referred to herein as "nodes"). As part of configuration service support, the user/administrator may provide the intent data model and a mapping between the intent data model to the device configuration model.

Some systems (e.g., network security management systems) may support a rule analysis, which may detects shadow rules, redundant rules, and/or rule placements by analyzing device-level rules. In contrast techniques described herein may operate in the stateful intent layer, with high level objects. As such, the techniques described herein that operate in the stateful intent layer may perform an intent level analysis to determine conflicts that may not be inferred from device-level rules. Additionally, the techniques described herein that operate in the stateful intent layer may provide improved scalability compared to systems that rely on device-level rules.

The techniques described herein that operate in the stateful intent layer may have an improved performance over systems relying on device-level rules. For example, techniques described herein that operate in the stateful intent layer may use a graph analysis that enables an Eager graph composition by modeling the hierarchy of endpoints and representing intent action as edges. As used herein, an Eager composition may comprise a process to detect conflicts in intents in real time. Using a graph analysis, such as, for example, an Eager composition, may help to enable the performance of conflict resolution to be constant, rather than linearly increase with a number of rules in the system. For example, in security management, the number of rules may be in thousands, which may not scale well for systems relying on device-level rules.

The techniques described herein that operate in the stateful intent layer may have improved intent recovery over systems relying on device-level rules. For example, when intents have conflicts, techniques described herein that operate in the stateful intent layer may allow a conversational interface with various recovery options. The techniques described herein that operate in the stateful intent layer may have improved extensibility over systems relying on device-level rules. For example, techniques described herein that operate in the stateful intent layer may provide a solution that is based on a model (e.g., a unified graph model), which may help to allow extensibility for a new intent models registered in the system.

This disclosure describes a model driven approach for one or more of following. In some examples, techniques described herein may configure a controller device to detect intent policy conflicts across a same intent type in real time. Examples of intent types (also referred to herein as "actions") may include, for example, a connectivity type, a firewall type (e.g., allow, block), a network address translate (NAT) type, or another intent type. For example, a controller device may be configured to detect and resolve security intents that conflict with each other. For example, a first intent may comprise a firewall allow type that allows a marketing group to communicate to a salesforce application. In this example, a second intent may comprise a firewall allow type that denies all groups (including the marketing group) communication to the Internet. Techniques described herein that operate in the stateful intent layer may detect the conflict between the first intent and the second intent and resolve the conflict.

Techniques described herein may configure a controller device to detect intent policy conflicts across the different intent types in real time. For example, a first intent may comprise a firewall intent to allow a first address (e.g., Address1") to access a salesforce application. In this example, a second intent may comprise a NAT of the first address to a second address (e.g., Address2). In this example, the second intent (e.g., the NAT of the first address to a second address) would invalidate the firewall (Allow) intent of the first intent. Techniques described herein that operate in the stateful intent layer may detect the conflict between the first intent and the second intent and resolve the conflict.

Techniques described herein may configure a controller device to provide a resolution when conflicts are observed. The resolution may include changing an order of the intents in the case of firewall intents. For example, the controller device may apply a NAT type before applying a firewall allow type or a firewall deny type (also referred to herein as a "firewall block type"). In some examples, to provide a resolution when conflicts are observed, the controller device may modify an intent. For example, the controller device may modify a first intent that denies all groups (including a marketing group) communication to the Internet to allow the marketing group to communicate to the Internet to satisfy a second intent that allows the marketing group to communicate to a salesforce application using the Internet.

Techniques described herein may configure a controller device to validate intent on direct policy changes or out-of-band (OOB) changes. For example, users (e.g., an administrator) may directly modify policies. In this example, the controller device may validate the business policies for these changes and provide impacted business policies.

Techniques described herein may configure a controller device to validate intents on discovery from Brownfield deployments (e.g., when connecting previously setup network devices to the controller device). When validating intents on discovery, intents may be "shadowed," because device rules are misplaced or the intents could be invalid. As used herein, a first intent to comprises changes to be applied to a subgroup is shadowed when, for example, a second intent applies the changes to a group that includes the subgroup. In this case, the first intent is shadowed such that the second intent renders the first intent redundant. For instance, a first intent may allow the marketing group to communicate to the Internet and the second intent may allow all groups, including the marketing group, to communicate to the Internet.

Techniques described herein may configure a controller device to be extensible to allow new intent types. For example, the controller device may include additional types than a connectivity type, a firewall type (e.g., allow, block) and a network address translate (NAT) type.

In accordance with the techniques of the disclosure, a controller device may be configured to apply an extension to policy graph abstraction (PGA) for modeling intent dependency, detecting conflicts in intents (e.g., firewall intents), and providing a resolution by the ordering of the intents (e.g., firewall intents). This disclosure also provides an approach for the stateful intent layer for heterogeneous intent types, which may help to allow the controller device to detect the conflicts across any intent, to provide a resolution for the intent conflicts, to discover business policies from Brownfield deployments (e.g., deploying devices previously configured), and/or to validate intents.

In accordance with the techniques of the disclosure, a controller device may, when a new intent is created or updated, form a logical packet from the intent. For example, the controller device may receive the intent "NAT Intent: NAT Address 1 to Address 2." In this example, the controller device may form the logical packet "{Action: IP Translate, Src: Address2}" from the intent. The controller device may apply a transition function that results in an updated logical packet of "{Action: IP Translate, Src : Address2, properties: {OldSrc:Address1}}."

Based on intent dependencies of the data structure (e.g., a unified graph model), a stateful intent analysis engine (also referred to herein as simply an "intent analysis engine") of the controller device may pick up one or more dependent intents. An analysis handler of the controller device may be registered for an intent. For example, a "function nat-intent-analysis" function may be configured for a NAT intent and a function firewall-intent-analysis function may be configured for a firewall intent.

The intent analysis engine may check, with the analysis handler, if intent change is conflicting with any of the one or more dependent intents. If the intent change is conflicting with any of the one or more dependent intents, the intent analysis engine, with the analysis handler, provides a resolution. The resolution may be either ordering the modified intent or a change in the current intent. The intent analysis engine may append any changes (e.g., an ordering the modified intent or a change in the current intent) as a "ChangeList" to the packet. For example, the intent analysis engine may append "{Action: IP Translate, Src: Address2, properties: {OldSrc:Address1,ChangeList:[Intent type: FirewallIntent, uuid: 1234, changes]}} to the change list. In this way, the intent analysis engine may help to ensure conflict free composed policies. As used herein, conflict free composed policies may refer to policies that do not have any conflicts.

FIG. 1 is a block diagram illustrating an example including network devices of an enterprise network 2 that are managed using a controller device 10. Network devices 14A-14G (collectively, "network devices 14") of enterprise network 2 include network devices interconnected via communication links to form a communication topology in order to exchange resources and information. Network devices 14 (also generally referred to as remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to network devices 14 via enterprise network 2. Controller device 10, in some examples, forms part of a device management system, although only one device of the device management system is illustrated for purpose of example in FIG. 1. Controller device 10 may be coupled either directly or indirectly to the various network devices 14. Once network devices 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed network devices 14. Another example device protocol may include NETCONF, however, techniques described herein may be used with other device protocols. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Another example device protocol may include NETCONF, however, techniques described herein may be used with other device protocols. Further details of the NETCONF protocol can be found in Enns et al., RFC 6241, "Network Configuration Protocol (NETCONF)," Network Working Group, the Internet Engineering Task Force draft, June 2011, available at https://tools.ietf.org/html/rfc6241, the entire contents of which are incorporated herein by reference.

In common practice, controller device 10, also referred to as a network management system (NMS) or NMS device, and network devices 14 are centrally maintained by an IT group of the enterprise. Administrators 12 interacts with controller device 10 to remotely monitor and configure network devices 14. For example, administrators 12 may receive alerts from controller device 10 regarding any of network devices 14, view configuration data of network devices 14, modify the configurations data of network devices 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with network devices 14, e.g., through telnet, secure shell (SSH), or other such communication sessions. That is, network devices 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of network devices 14, e.g., network device 14F, using controller device 10, to directly configure network device 14F. In this manner, a user can provide commands in a format for execution directly to network devices 14.

Further, administrators 12 can also create scripts that can be submitted by controller device 10 to any or all of network devices 14. For example, in addition to a CLI interface, network devices 14 also provide interfaces for receiving scripts that specify the commands in accordance with a scripting language. In a sense, the scripts may be output by controller device 10 to automatically invoke corresponding remote procedure calls (RPCs) on the managed network devices 14. The scripts may conform to, e.g., extensible markup language (XML) or another data description language.

Administrators 12 uses controller device 10 to configure network devices 14 to specify certain operational characteristics that further the objectives of administrators 12. For example, administrators 12 may specify for a network device 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within network devices 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of network devices 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, ... $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In accordance with the techniques of the disclosure, controller device may maintain a data structure. The data structure may include a plurality of vertices and a plurality of edges, each vertex of the plurality of vertices being representative of a respective network device of network devices 14 or a respective stateless intent of a plurality of stateless intents and the plurality of edges defining relationships between the plurality of vertices.

Controller device 10 may be configured to receive an indication of a stateful intent. In some examples, the stateful intent specifies an intended state to be translated into one or more device-level configuration changes for network devices 14. Controller device 10 may generate a logical packet based on the stateful intent. For example, controller device 10 may apply an intent policy function (e.g., function firewall-intent-policy or function nat-intent-policy) that generates the logical packet from the intent.

Controller device 10 may determine a dependent intent of the data structure based on the logical packet. For example, controller device 10 may determine an intent type from the intent. In this example, controller device 10 may traverse the logical packet from a source indicated by the intent to a destination indicated by the intent to determine one or more edges (e.g., vertices representing an intent action) that have the intent type determined from the intent. Controller device 10 may determine the dependent intent as the intent specified by the one or more edges that have the intent type determined from the intent. For instance, controller device 10 may determine an intent for translating a network address from a first address to a second address specifies a dependent type of "firewall-allow." In this instance, controller device 10 may determine an intent of an ancestor edge that has the firewall-allow intent type as the dependent intent.

Controller device 10 may determine whether the dependent intent conflicts with the stateful intent. In response to determining that the dependent intent conflicts with the stateful intent, controller device 10 may determine a resolution that resolves the conflict between the dependent intent and the stateful intent based on the dependent intent and the stateful intent. For example, controller device 10 may determine a resolution that reorders the intents such that controller device 10 translates the network address from the first address to the second address and then applies the intent for the firewall-allow to the second address. Determining whether intents conflicts in the stateful intent layer may improve a performance of detecting conflicts between intent compared to systems relying on device-level rules. Controller device 10 may output an indication of the resolution. For example, controller device 10 may append a change list for the logical packet.

Figure 2:
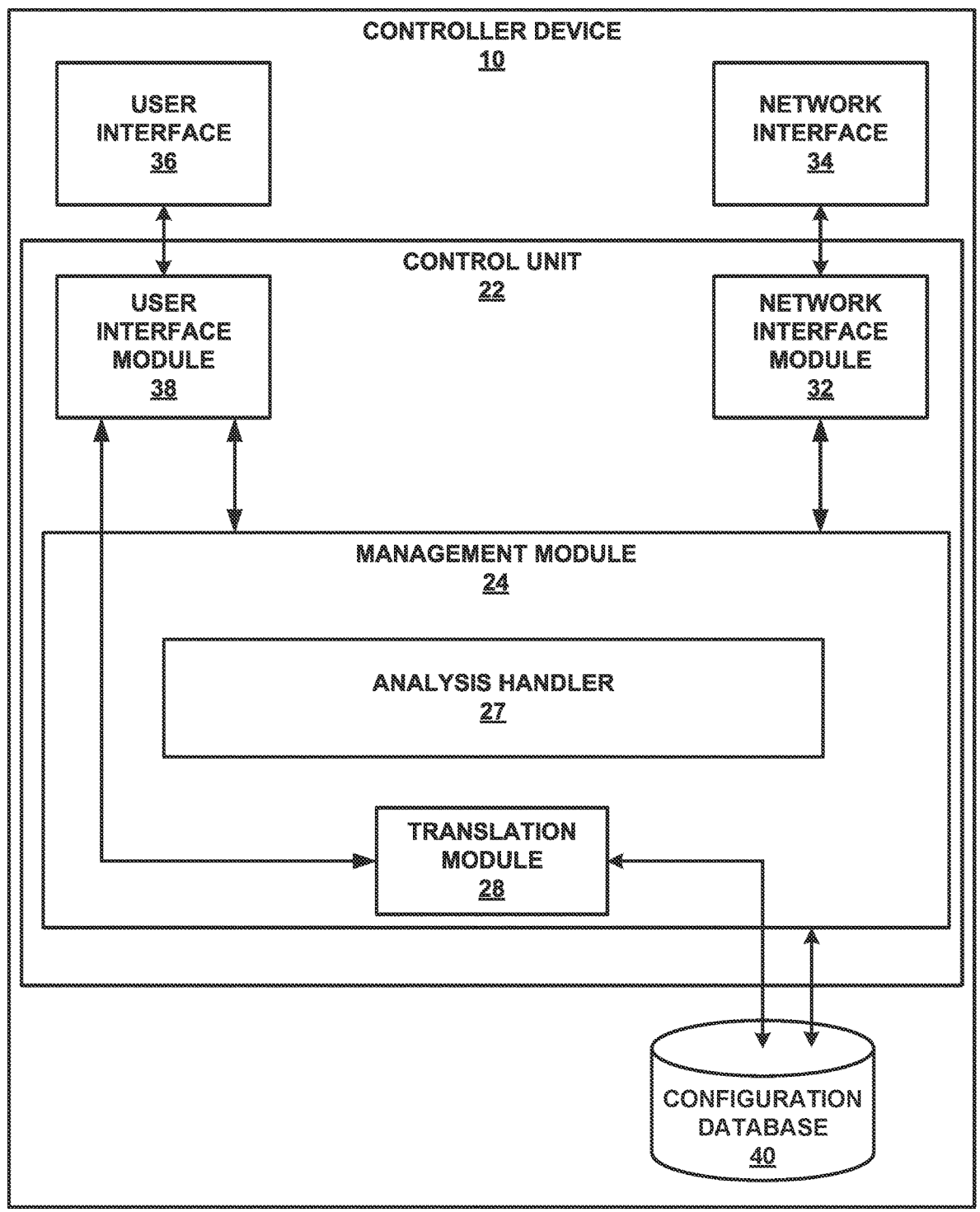
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of network devices 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

Control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network devices 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image. In this example, management module 24 further includes analysis handler 27 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 may include a data structure describing managed network devices, e.g., network devices 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., network devices 14). Configuration database 40 may include a database that comprises a unified intent data model. In some examples, configuration database 40 may store a low level configuration that includes, for each respective owned resource of a set of owned resources, a pointer indicating an owner for the respective owned resources of network devices 14.

In accordance with the techniques of the disclosure, management module 24 may maintain a data structure in configuration database 40. The data structure may include a plurality of vertices and a plurality of edges, each vertex of the plurality of vertices representing a respective network device of a plurality of network devices (e.g., network devices 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Management module 24 may generate a logical packet based on the stateful intent. For example, management module 24 may apply an intent policy function (e.g., function firewall-intent-policy or function nat-intent-policy) that generates the logical packet from an intent generated with the user interface module 38.

Analysis handler 27 may be configured to determine a dependent intent of a data structure based on the logical packet. For example, analysis handler 27 may determine an intent type from the intent. In this example, analysis handler 27 may traverse the logical packet from a source indicated by the intent to a destination indicated by the intent to determine one or more edges (e.g., vertices representing an intent action) that have the intent type determined from the intent. Analysis handler 27 may determine the dependent intent as the intent specified by the one or more edges that have the intent type determined from the intent. For instance, analysis handler 27 may determine an intent for translating a network address from a first address to a second address specifies a dependent type of "firewall-allow." In this instance, analysis handler 27 may determine an intent of an ancestor edge that has the firewall-allow intent type as the dependent intent.

Analysis handler 27 may determine whether the dependent intent conflicts with the stateful intent. In response to determining that the dependent intent conflicts with the stateful intent, analysis handler 27 may determine a resolution that resolves the conflict between the dependent intent and the stateful intent based on the dependent intent and the stateful intent. For example, analysis handler 27 may determine a resolution that reorders the intents such that management module 24 translates the network address from the first address to the second address and then applies the intent for the firewall-allow to the second address. Determining whether intents conflicts in the stateful intent layer may improve a performance of detecting conflicts between intent compared to systems relying on device-level rules. Analysis handler 27 may output an indication of the resolution. For example, analysis handler 27 may append a change list for the logical packet.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure network devices 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

Figure 3:
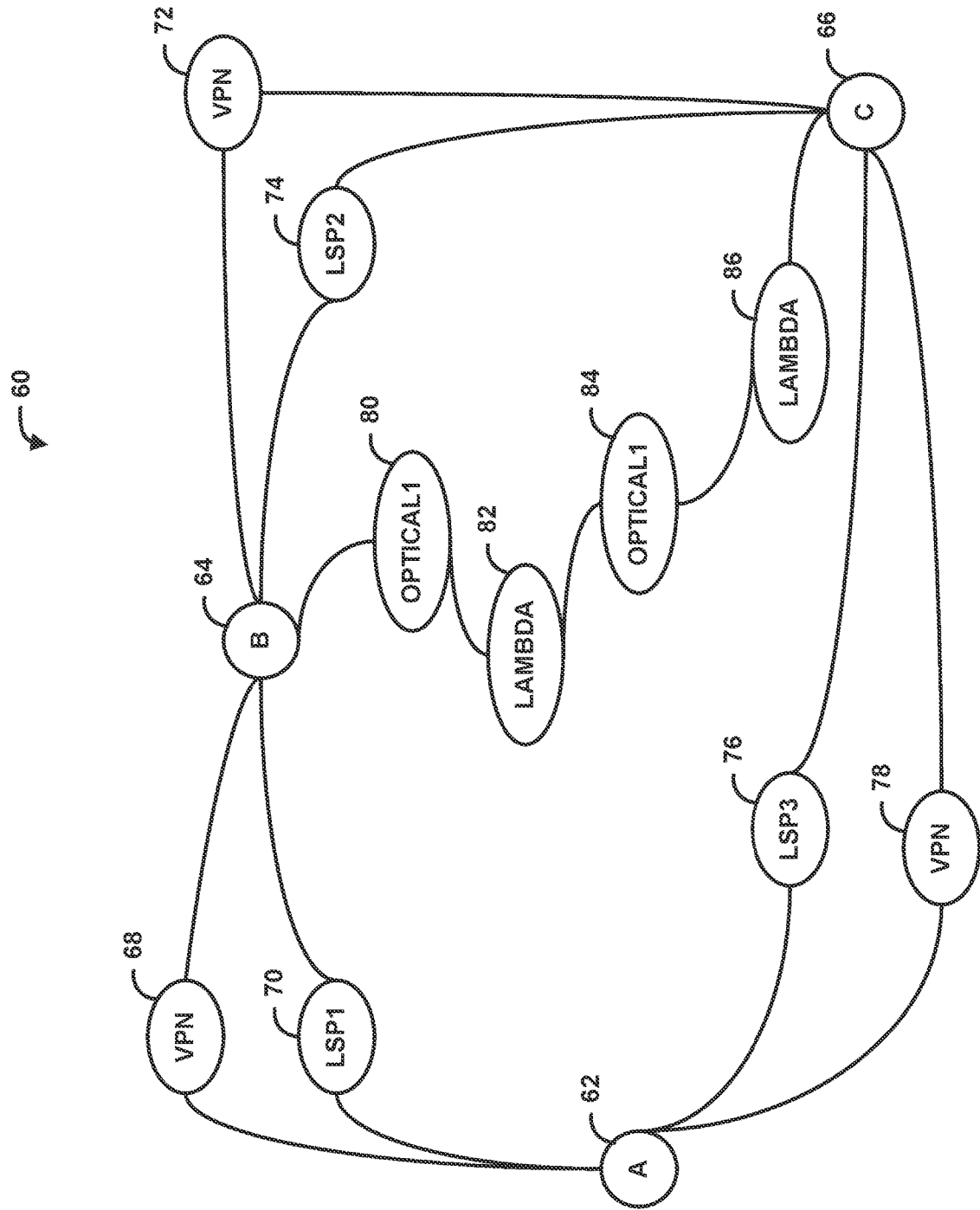
FIG. 3 is a conceptual diagram illustrating an example unified graph model for an intent data model.

FIG. 3 is a conceptual diagram illustrating an example unified graph model 60 for an intent data model. The process illustrated in FIG. 3 may represent an example of how controller device 10 may generate an intent-generated configuration. Unified graph model 60 may be an example of a data structure stored by configuration database 40 of FIG. 2. Unified graph model 60, in this example, includes nodes A 62, B 64, and C 66, among others, which may represent respective network devices (e.g., network devices 14). As shown, unified graph model 60 may include edges defining relationships between the plurality of nodes A 62, B 64, and C 66. For instance, edges connecting node B 64 and node C 66 via LSP2 may define an RSVP LSP between node B 64 and node C 66.

Initially, unified graph model 60 may not include VPN 68, VPN 72, and VPN 78, nor optical 80, lambda 82, optical 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76. Furthermore, as a result of additional capacity being required as an optical intent, additional nodes optical 80, lambda 82, optical 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . . " This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10 G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. applicant Ser. No. 15/462,465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

However, even when accounting for existing stateless intents, a controller device (e.g., controller device 10) may apply conflicting intents configlets that cause the controller device to no longer realize stateful intents, which would result in the controller device failing to maintain intent-generated configurations. For example, the controller device may receive a first intent specifying a set of configuration changes to be applied to node B 64 and node C66. For instance, the controller device may receive the first intent that specifies a set of configuration changes to LSP2 74 that reduces the bandwidth from 50 Mbps to 30 Mbps. In this example, applying the first intent causes the controller device to no longer configure network devices 14 to realize an RSVP LSP between B-C with 50 Mbps, which may result in controller device failing to satisfy a second intent for a particular bandwidth between node A 62 and node C 66.

In accordance with techniques described herein, controller device 10 may be configured to determine whether a dependent intent conflict (e.g., an existing intent) with the stateful intent being applied to unified graph model 60. In response to determining that the dependent intent conflicts with the stateful intent, analysis handler 27 may determine a resolution that resolves the conflict between the dependent intent and the stateful intent based on the dependent intent and the stateful intent. For example, controller device 10 (e.g., analysis handler 27) may determine a resolution that reorders the intents such that management module 24 translates the network address from the first address to the second address and then applies the intent for the firewall-allow to the second address. Determining whether intents conflicts in the stateful intent layer may improve a performance of detecting conflicts between intent compared to systems relying on device-level rules.

Figure 4:
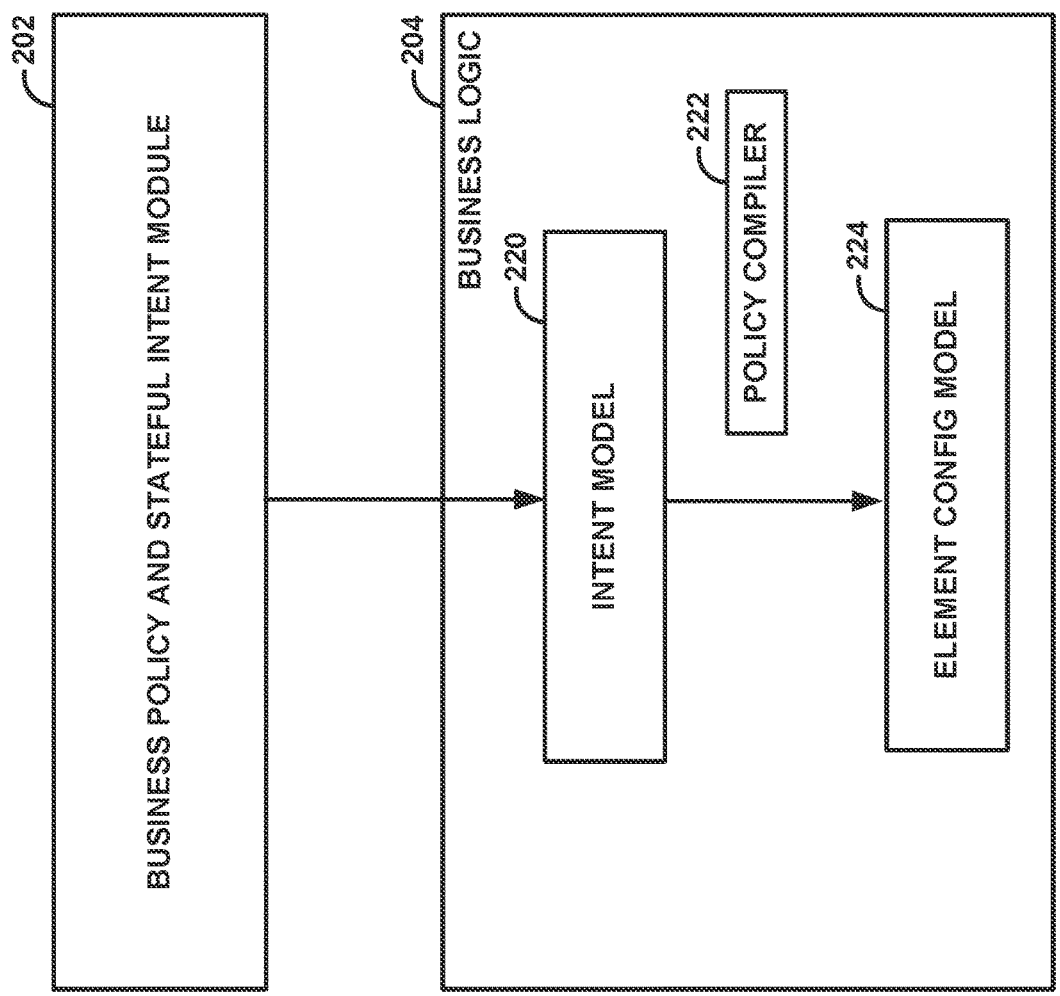
FIG. 4 is a conceptual diagram illustrating an example controller device configured to generate a device-level configuration using an intent, in accordance with the techniques of the disclosure.

FIG. 4 is a conceptual diagram illustrating an example controller device 210 configured to generate a device-level configuration using an intent, in accordance with the techniques of the disclosure. Controller device 210 may be an example of controller device 10 of FIG. 1.

Controller device 210 may represent an intent based controller system. Controller device 210 may be configured to support intents to ease the management of networks.

Intents may be declarative. To realize the intents, controller device 210 may select the optimal resources (e.g., user network interfaces (UNIs) in connectivity services such as a software-driven (SD) wide-area network (WAN), virtual private network (VPN), or another resource). In security, controller device 210 may support a firewall policy, NAT, unified threat management (UTM) through Intents. Controller device 210 may use hierarchical data modeling for intents, low-level device configuration models, and/or resources.

Controller device 210 may support user intent based security policies. For example, controller device 210 may create policies according to a logical business structure such as, for example, but not limited to, a user, a user group, a geographical location, a site, a tenant, an application, or a threat risk.

Intent categories user intents can be categorized into a stateful intent (e.g., business policy) and a stateless intent. As used herein, business policy may refer to intents to be resolved based on a current state of a network (e.g., a stateless intent). Controller device 210 may resolve stateful intents based on a current state of a network. In contrast, a stateless intent may represent a fully declarative way of describing the intended network/compute/storage state, without a current state of network. Controller device 210 may apply an application workflow to translate the stateful intent into stateless intents. Controller device 210 may, in the stateful layer (e.g., a business policy layer), detect intent conflicts, provide a resolution, in case of a conflicts, and compose the intents. To compose the intents, controller device 210 may order the intents in case of security intents and/or generate the stateless intents.

Configuring controller device 210 to apply Policy Graph Abstraction (PGA) may allow controller device 210 to independently express the network policies independently. When applying PGA, controller device 210 may leverage the graph structure to detect and resolve policy conflicts. When applying PGA, controller device 210 may model and compose service chaining policies, e.g., the sequence of middleboxes to be traversed, by merging multiple service chain requirements into conflict-free composed chains.

In PGA, a model includes a vertex and an edge. Each vertex in a PGA graph model represents an endpoint group (EPG) which comprises a set of endpoints (EPs). An EP is the smallest unit of abstraction for which a policy is applied, e.g., a server, VM, client device, network, subnet, or end-user. An EPG comprises all EPs that satisfy a membership predicate specified for the EPG. By default, in PGA, no communication is allowed between any EPs. A directed edge between EPGs is required to specify allowed communication in a PGA policy. PGA provides Graph based Policy Analysis that provides Eager Composition of "Network policies" to "Conflict free composed policies".

With respect to PGA, there is a need for intent extensibility. For example, a controller device may include multiple use case applications. For example, the controller device may support a first use case directed to a connectivity service controller (e.g., service provider connectivity services-VPNs, etc.). The controller device may support a second use case to support an SD-WAN Controller (e.g., core to customer network). The controller device may support a third use case directed to manage security. Initially, a customer installs the connectivity service to the controller device, then the customer installs the WAN controller to the controller device. In this PGA example, a business intent model should be extended with WAN stateless intents. Additionally, the PGA model may need to be extended to manage security, which may need to augment the intent analysis engine of the PGA system (e.g., conflict detection and resolution).

To address one or more of the foregoing aspects of PGA, controller device 210 may be configured to determine whether a dependent intent conflict with the stateful intent being applied to data structure (e.g., unified graph model 60). In response to determining that the dependent intent conflicts with the stateful intent, controller device 210 may determine a resolution that resolves the conflict between the dependent intent and the stateful intent based on the dependent intent and the stateful intent. For example, controller device 210 may determine a resolution that reorders the intents such that controller device 210 translates the network address from the first address to the second address and then applies the intent for the firewall-allow to the second address. Determining whether intents conflicts in the stateful intent layer may improve a performance of detecting conflicts between intent compared to systems relying on device-level rules.

Figure 5:
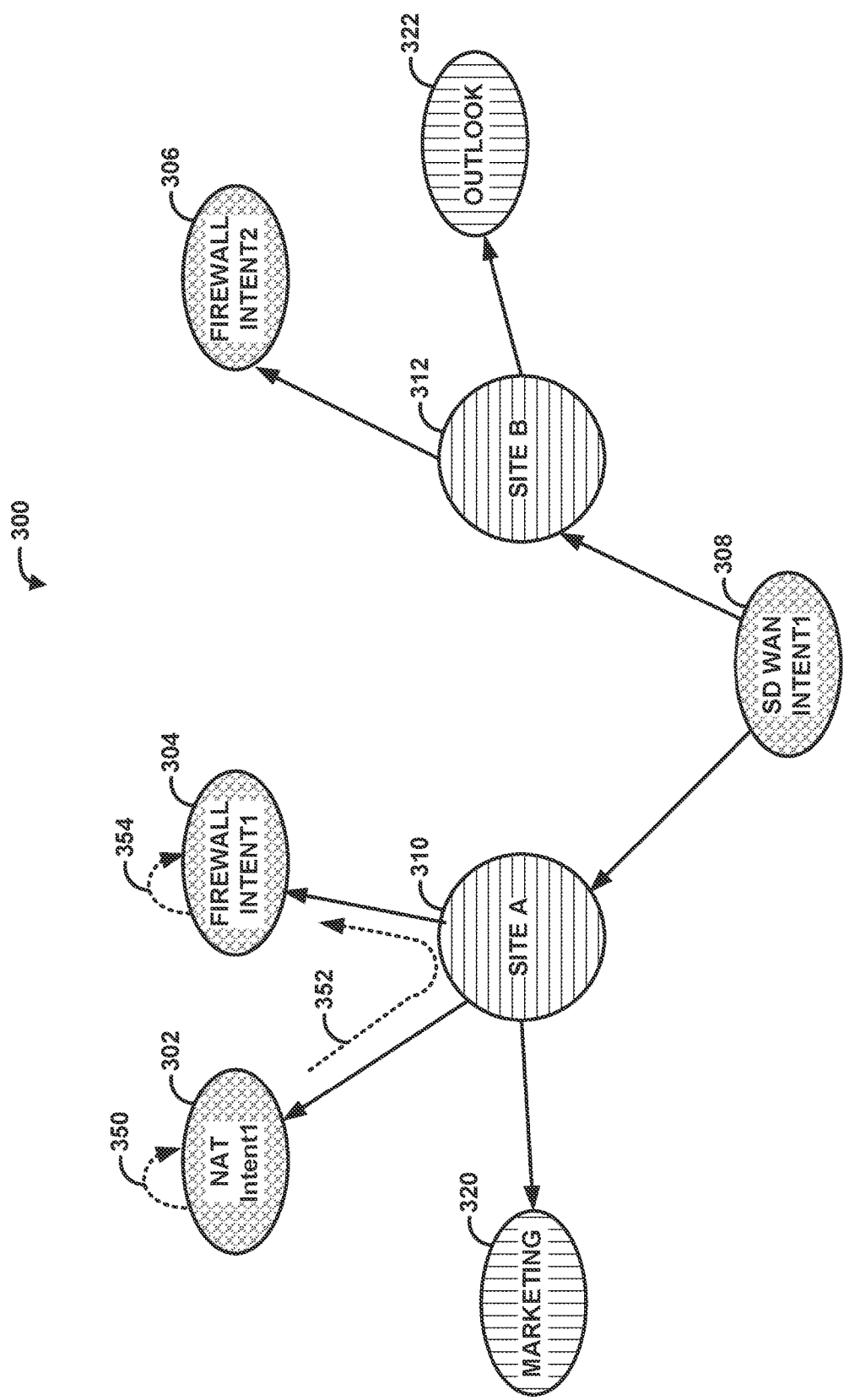
FIG. 5 is a conceptual diagram illustrating an example data structure, in accordance with the techniques of the disclosure.

FIG. 5 is a conceptual diagram illustrating an example data structure 300, in accordance with the techniques of the disclosure. The techniques described herein that operate in the stateful intent layer may configure controller device 10 to represent a complete network as a unified graph that contains stateless intents. The graph, represented as data structure 300 in FIG. 5, may include devices and/or sites as vertices, stateless intents as vertices (which are also referred to herein as "edges"), and endpoints as vertices. Stateless intents represented as vertices may have a reference association with sites. As shown, data structure 300 includes vertex 302 ("NAT Intent1"), vertex 304 ("Firewall Intent1"), vertex 306 ("Firewall Intent2"), vertex 308 ("SD-WAN Intent1"), vertex 310 ("Site A"), vertex 312 ("Site B"), vertex 320 ("Marketing"), and vertex 322 ("Outlook").

In this way, controller device 10 may represent the "unified intent graph" as a state machine, where a "logical packet" determines the state of the network. Controller device 10 may determine the transitions in the intent model by a logical packet that includes a site/device location (e.g., vertex id) and an intent policy functions" may be attached to intent vertices in the graph (e.g., data structure 300).

Endpoint groups (EGPs) are discussed in the following. In accordance with the techniques of the disclosure, controller 10 may be configured to use end points as part of the EPG. Controller device 10 may maintain EPG hierarchy as a tree. Controller device 10 may generate a model (e.g., data structure 300) that captures: (1) intents and a corresponding intent action; (2) a dependency to other intents; (3) an analysis handler that is registered for every intent dependency (4) an intent policy function for every intent configured to return a logical packet, that describes the intent effect.

Whenever an intent change is submitted, controller device 10 may generate a logical packet through the intent (e.g., an intent policy function). For instance, in response to receiving an intent 302 ("NAT Intent1") to perform a NAT from a first address to a second address, controller device 10 may generate a logical packet using a NAT intent policy function (e.g., function nat-intent-policy) (350). An intent policy function working on the intent may provide the updated transitioned packet. For example, controller device 10 may apply a NAT intent policy function on the NAT intent for vertex 302 to generate an updated transitioned packet that traverses to vertex 310 (352).

Controller device 10 may check the dependent intents based on intent actions (354), which is also referred to herein as "intent types." For example, controller device 10 may determine that vertex 302 indicates an intent NAT specifying a dependency type of "firewall-allow."

Based on the intent dependency types, an intent analysis engine (e.g., analysis handler 27) may determine one or more dependent intents. For example, controller device 10 may determine an intent of an ancestor edge (e.g., vertex 304) that has the firewall-allow intent type as a dependent intent. For instance, if an intent is a firewall intent comprising a source endpoint and a destination endpoint, controller device 10 may traverse the EPG tree to check for the edges. An analysis handler (e.g., analysis handler 27) may check if the intent change (e.g., the NAT intent represented by vertex 302) is conflicting with any dependent intents (e.g., the firewall-allow intent represented by vertex 304). In response to determining that the intent change is conflicting with any dependent intents, the analysis handler may provide a resolution. For example, the analysis handler may order a modified intent. For instance, the analysis handler may apply the NAT intent represented by vertex 302 before applying the firewall-allow intent represented by vertex 304, in which case the NAT function applies the firewall-allow intent represented by vertex 304 to the second address instead of the first address. In some examples, the analysis handler may change the dependent intent. For instance, the analysis handler may modify the firewall-allow intent represented by vertex 304 to apply to the second address of the NAT intent represented by vertex 302. The analysis handler may append any changes from the resolution as "ChangeList" to the logical packet. Controller 10 may continue to apply the unified graph (e.g., data structure 300).

Figure 6:
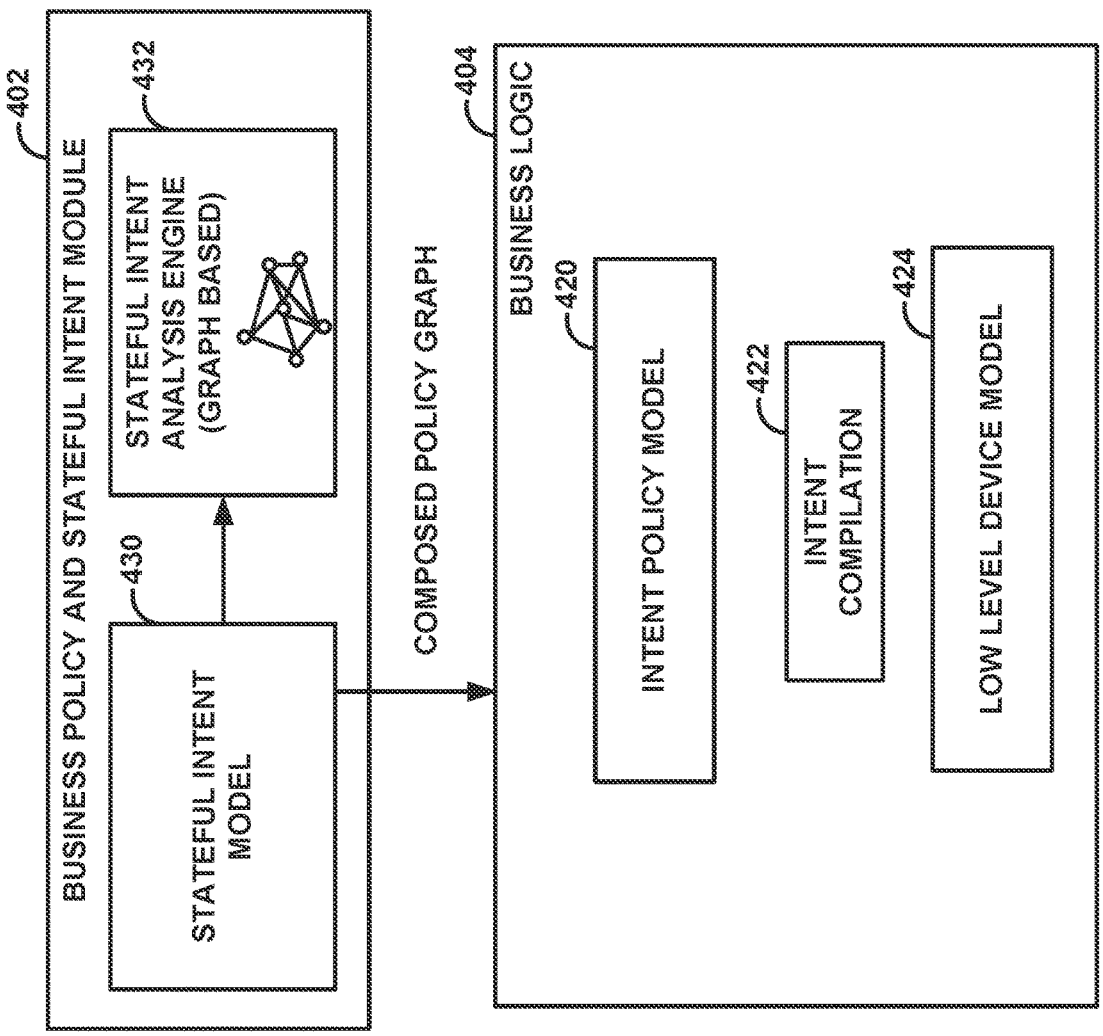
FIG. 6 is a conceptual diagram illustrating an example controller device configured to perform conflict detection using a graph-based stateful intent analysis, in accordance with the techniques of the disclosure.

FIG. 6 is a conceptual diagram illustrating an example controller device 410 configured to perform conflict detection using a graph-based stateful intent analysis, in accordance with the techniques of the disclosure. As shown, controller device 410 may include business policy and stateful intent module 402 (referred to herein as simply "intent module 402") and business logic 404. Intent module 402 includes stateful intent model 430 and stateful intent analysis 424, which may be graph based. Business logic 404 may include intent policy model 420, intent compilation 422, and low level device model 424.

Controller device 410 (e.g., stateful intent model 430) may classify intents by the action (e.g., intent type) that the respective intent is performing. For example, when an action is connectivity, controller device 410 may connect the endpoints. An action of connectivity may comprise, for example, a VPN, peer-to-peer (P2P), virtual LAN (VLAN), or SD-WAN intents. An action of allow may comprise, for example, a firewall allow intent that allows endpoint communication. An action of block (also referred to herein as "deny") may comprise, for example, a firewall block intent that blocks endpoint communication. An action of NAT may comprise, for example, a NAT that translates an endpoint IP address. These actions would be extensible. For example, controller device 410 may support actions that comprise zero or more of a connectivity, allow, block, NAT, and/or one or more other actions. Each intent definition may be registered with "intent action type."

A logical packet may include an action (e.g., connect, allow, block, or NAT), a source ("Src") endpoint, a destination (e.g., "Dst") endpoint, and properties as shown in the following table.

| Field | Description |
| --- | --- |
| Action | Action of the packet. Based on Business Intent, Action would be created. Allowed values are:<br>Connect<br>Allow<br>Block<br>IP Translate<br>... |
| Source | Source Endpoint |
| Destination | Destination Endpoint |
| Properties | Json with key, value pairs. Populated by the "Intent policy functions" attached to the vertices in Unified Intent model. |

The logical packet may be extended based on new policies supported.

Controller device 410 may capture intent dependencies as part of a model. For example, a NAT action may impact a firewall allow or firewall block action. In this example, stateful intent analysis engine 432 may determine a dependency between the NAT action to firewall actions (e.g., allow or block).

Intent module 402 may determine transitions in stateful intent model 430 by the packet and policy functions in the graph. Whenever a new intent is created or updated, intent module 402 may form a logical packet from the intent. For example, intent module 402 may determine a NAT Intent: NAT Address 1 to Address 2, with a logical packet of {Action: IP Translate, Src: Address2}. In this example, intent module 402, with the transition function, would determine the updated packet: Logical Packet: {Action: IP Translate, Src: Address2, properties: {OldSrc:Address1 }}.

Based on the intent dependencies (e.g., actions), stateful intent analysis engine 432 may determine dependent intents. An analysis handler may be registered for an intent. Intent module 402, with the analysis handler, may check if an intent change is conflicting with any dependent intent. If intent module 402 determines an intent change is conflicting with any dependent intent (e.g., yes), intent module 402 provides a resolution. Intent module 402 may provide the resolution to comprise ordering a modified intent or change the current intent (e.g., the intent currently being applied). Intent module 402 may append changes (e.g., ordering a modified intent or a change the current intent) as a "ChangeList" to the packet. For example, intent module 402 may append changes as a "ChangeList" to the packet to include {Action: IP Translate, Src: Address2, properties: {OldSrc:Address1,ChangeList:[Intent type: FirewallIntent, uuid: 1234, changes]}}.

The "playbook" below describes an example of how a firewall intent and a NAT intent may be modeled.

```
{
    topic model_Security {
        description "Models related to Security Intents";
        synopsis "Security Intent";
        function firewall-intent-analysis{    >>> function definition
            description "function that does firewall intent analysis and orders";
            path firewall_intent_analysis.py;
```

```
        method intent_analysis;// This will take current Intent and list of dependent intent, and
return list of updated Intents.
        }
    function nat-intent-analysis{      >>> function definition
        description "function that does nat intent analysis";
        path nat_intent_analysis.py;
        method intent_analysis;// This will take current Intent and list of  dependent intent,
and return list of updated Intents.
        }
    function firewall-intent-policy{      >>> function definition
        description "function Intent policy function";
        path firewall_intent_analysis.py;
        method policy_function;// This will take current Intent and generate the "logical
packet "
        }
    function nat-intent-policy{      >>> function definition
        description "function that does nat intent analysis";
        path nat_intent_analysis.py;
        method policy_function;// This will take current Intent and generate the "logical
packet "
        }
        intent firewall-allow{
            type allow;       >>> Type of the Intent
            keys [ uuid];
            synopsis "Firewall allow intents";
                description "This model captures the Firewall allow intents";
            policyfunction firewall-intent-policy;
            field uuid{.   >>>> Fields in the model
                    type string;
                    description "key of the Intent";
            }
            field src{
                    Type string;
                description "src endpoint group";
            }
            Field destination{
                    Type string;
                description "destination endpoint group";
            }
        }
    intent nat{
        Type ip translate;     >>> Type of the Intent
        keys [ uuid];
        synopsis "NAT intents";
            description "This model captures the NAT intents";
        policyfunction nat-intent-policy;
        field uuid{.   >>>> Fields in the model
                type string;
                description "key of the Intent";
        }
        field src{
                Type string;
            description "src endpoint group";
        }
        depends [{       >>>Dependency population
            intent-type: firewall-allow,
            analysis-strategy {
              function nat-intent-analysis;
            }
        }]
        }
    }
}
```

Controller device 410 (e.g., intent module 402) may maintain EPG hierarchy as a tree. For applications, controller device 410 (e.g., intent module 402) may maintain the Internet is a root node. For source objects, controller device 410 (e.g., intent module 402) "any" may comprise the root node. The EPG can be a server, a VM, a client device, a network, a subnet, or an end-user.

Figure 7:
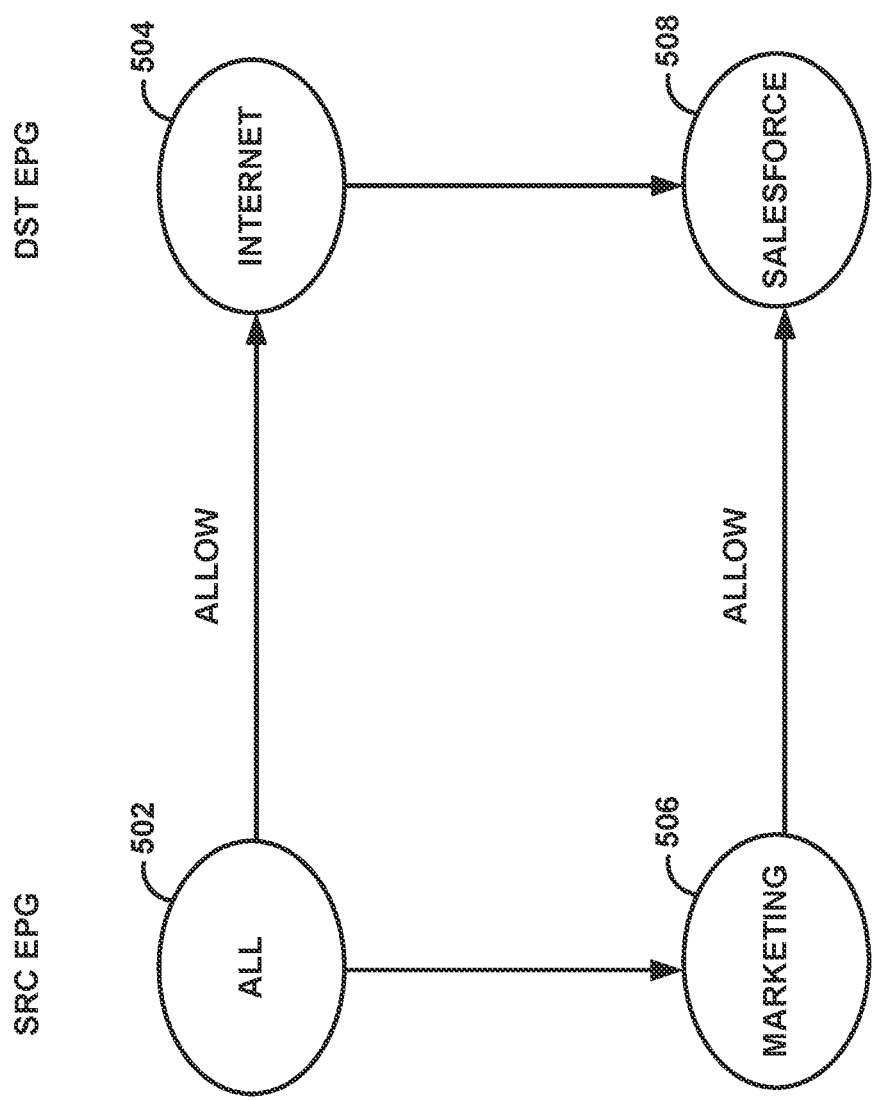
FIG. 7 is a conceptual diagram illustrating a first example of intent ordering of a child source node and a parent source node, in accordance with the techniques of the disclosure.

FIG. 7 is a conceptual diagram illustrating a first example of intent ordering of a child source node and a parent source node, in accordance with the techniques of the disclosure. Controller device 410 is discussed with reference to FIG. 7 for example purposes only.

A firewall stateful intent (e.g., allow or deny) may not have any ordered precedence with existing firewall intents. Stateful intent analysis engine 432 (also referred to herein as "intent analysis engine" may translate a firewall stateful intent by placing the firewall stateful intent in a list of "ordered intents." The firewall stateful intent may comprise a source endpoint, a destination endpoint, and a communication. As in PGA, stateful intent analysis engine 432 may model every endpoint group (EPG) as vertex. These EPGs may be hierarchical. Stateful intent analysis engine 432 may model intent communication (e.g., allow/deny) as an edge between EPGs. For instance, stateful intent analysis engine 432 may represent a firewall allow between group A and group B as: A is a vertex, B is a vertex; and allow is an edge (e.g., an acr) between vertex A and vertex B. When a new stateful intent is added, if the new stateful intent comprises a "firewall intent," stateful intent analysis engine 432 (e.g., using an analysis handler) may traverse the source endpoint (e.g., SRC EPG tree), and the destination endpoint (e.g., DST EPG Tree). In this example, stateful intent analysis engine 432 may check if there are any edge between ancestor nodes. If there are any edge between ancestor nodes, stateful intent analysis engine 432 may determine if at least one of the ancestor nodes is conflicting with the new stateful intent. In response to determining that at least one of the ancestor nodes is conflicting with the new stateful intent, stateful intent analysis engine 432 may determine that a conflict has occurred (e.g., raised a conflict). In response to determining that at least one of the ancestor nodes is conflicting with the new stateful intent, stateful intent analysis engine 432 may place the new stateful intent before the superset intent.

Stateful intent analysis engine 432 may order intents based on hierarchical grouping. Stateful intent analysis engine 432 may order conflicting rules from a child source node to a parent node. For example, stateful intent analysis engine 432 may determine the source EPG ("SRC EPG") and a destination EPG from the intent. Stateful intent analysis engine 432 may find the common ancestor edges. For example, stateful intent analysis engine 432 may traverse the SRC node tree and destination node tree recursively on a parent direction.

Stateful intent analysis engine 432 may determine if there is an edge between the SRC node tree and destination ("DST") node tree. Stateful intent analysis engine 432 may check if the edge type is dependent on the given intent type. In response to determining that the edge type is dependent on the given intent type (e.g., if yes), stateful intent analysis engine 432 may place the intent before the intents that has been discovered in above step. In the example of FIG. 7, stateful intent analysis engine 432 may place marketing vertex 506 and salesforce intent vertex 508 before All vertex 502 and Internet intent vertex 504.

Figure 8:
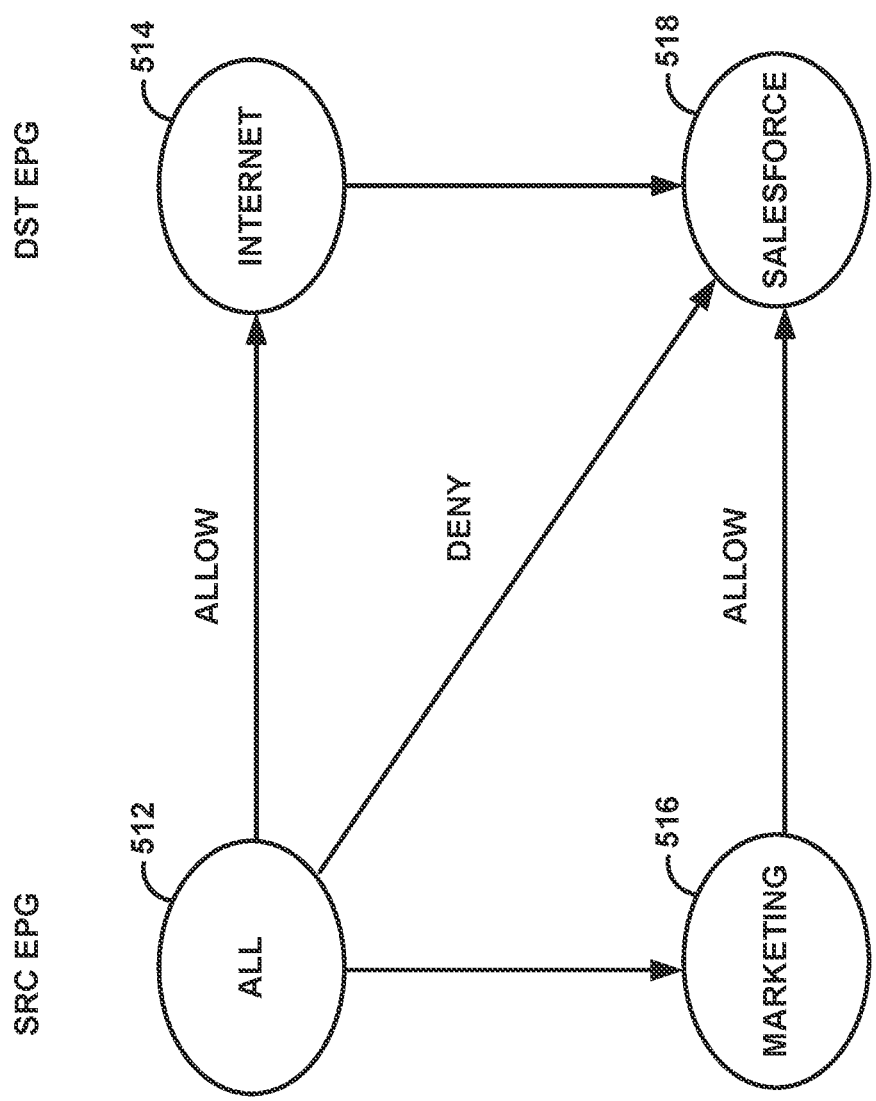
FIG. 8 is a conceptual diagram illustrating a second example of intent ordering of a child source node and a parent source node, in accordance with the techniques of the disclosure.

FIG. 8 is a conceptual diagram illustrating a second example of intent ordering of a child source node and a parent source node, in accordance with the techniques of the disclosure. In the example of FIG. 8, stateful intent analysis engine 432 may place marketing vertex 516 and salesforce intent vertex 518 before All vertex 512 and Internet intent vertex 514. However, the user may be allowed to override the intent order that is determined by stateful intent analysis engine 432.

Figure 9:
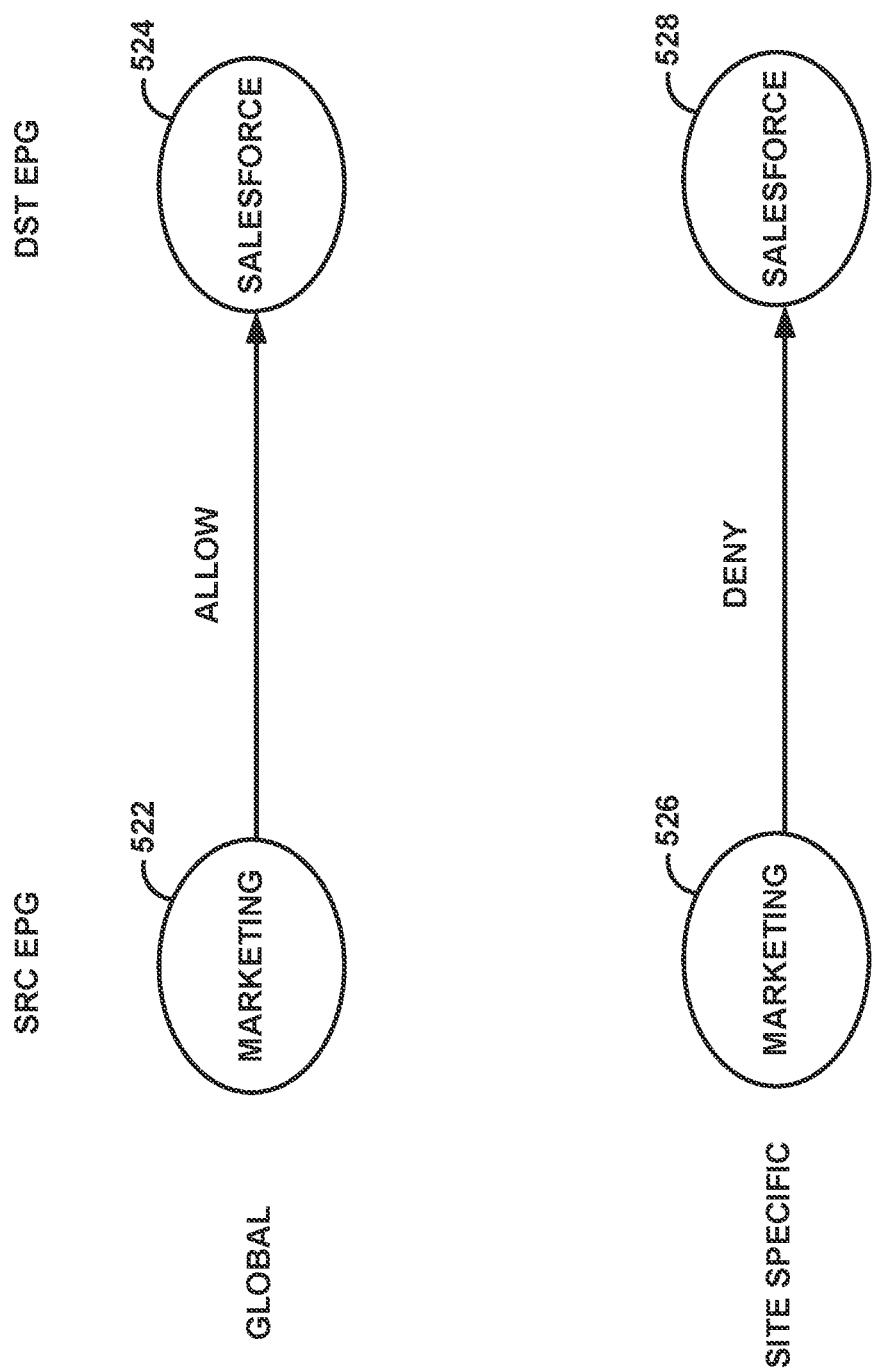
FIG. 9 is a conceptual diagram illustrating an example of intent ordering of a site specific source node and a global node, in accordance with the techniques of the disclosure.

FIG. 9 is a conceptual diagram illustrating an example of intent ordering of a site specific source node and a global node, in accordance with the techniques of the disclosure. Users can submit conflicting intents that may be detected by stateful intent analysis engine 432 and reported by stateful intent analysis engine 432. For example, a marketing vertex 522 and a salesforce vertex 524 connected by an allow arc would conflict with a marketing vertex 526 and a salesforce vertex 528 connected by an allow arc.

Figure 10:
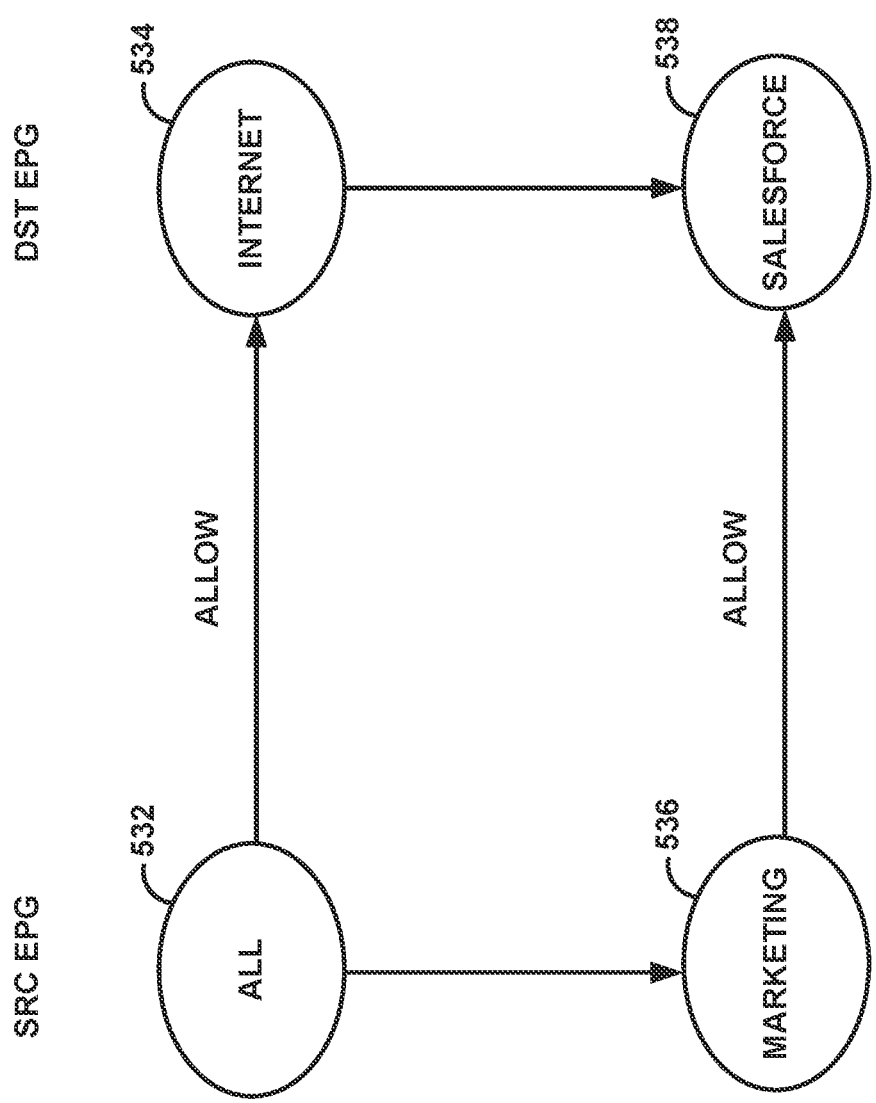
FIG. 10 is a conceptual diagram illustrating an example of redundant intent detection, in accordance with the techniques of the disclosure.

FIG. 10 is a conceptual diagram illustrating an example of redundant intent detection, in accordance with the techniques of the disclosure. Stateful intent analysis engine 432 may perform redundant intent detection. For example, stateful intent analysis engine 432 may detect redundant intents submitted by the end user that result in intents being shadowed. Stateful intent analysis engine 432 may detect the shadowed intents, notify the end user, and delete the shadowed intents.

For example, stateful intent analysis engine 432 may determine a source EPG (SRC EPH) and a destination EPG (DST EPG) from the intent. Stateful intent analysis engine 432 may find common ancestor edges. For example, stateful intent analysis engine 432 may traverse the SRC node tree and destination node tree recursively on a parent direction. Stateful intent analysis engine 432 may determine if there is an edge between the SRC node tree and the DST node tree. Stateful intent analysis engine 432 may check if the edge type is the same on the given intent type. If the edge type is the same on the given intent type, stateful intent analysis engine 432 may mark the intent as redundant. In the example of FIG. 10, a marketing vertex 536 and a salesforce vertex 538 connected by an allow arc would be shadowed by an all vertex 532 and an Internet vertex 534 connected by an allow arc. As such, stateful intent analysis engine 432 may remove marketing vertex 536 and salesforce vertex 538.

Figure 11:
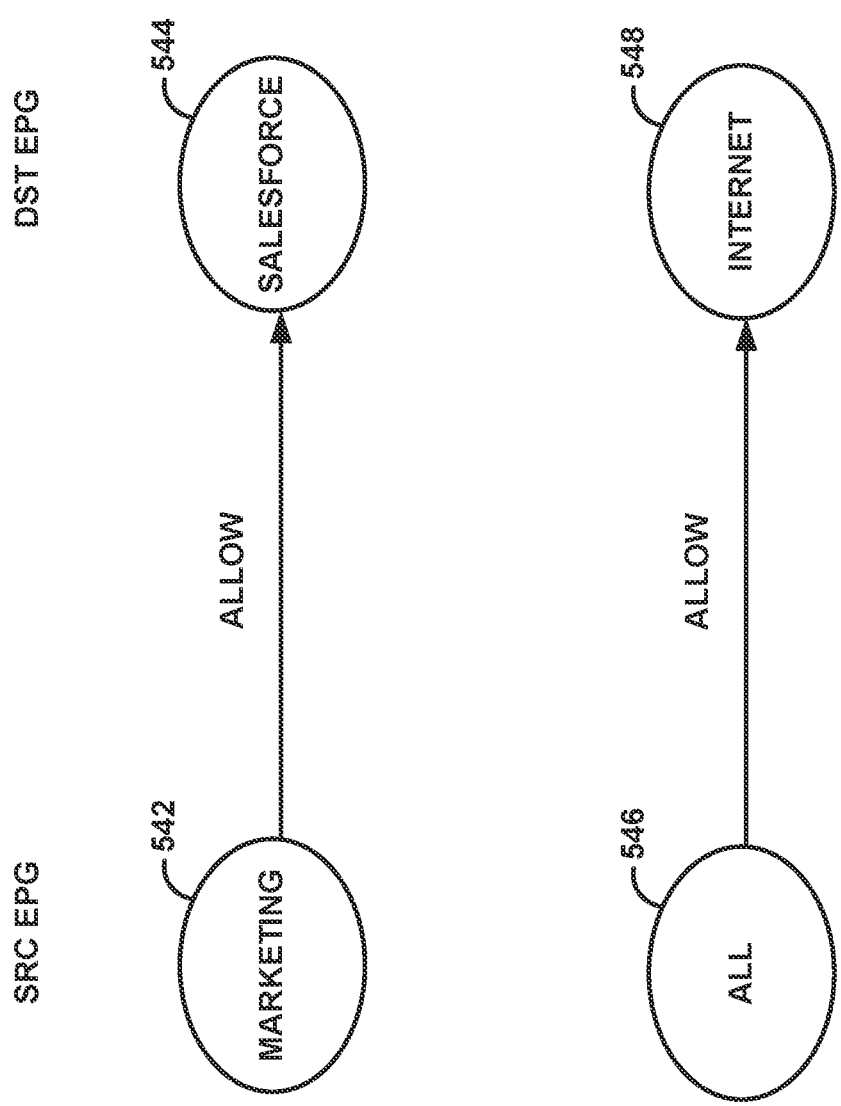
FIG. 11 is a conceptual diagram illustrating an example of redundant intent resolution, in accordance with the techniques of the disclosure.

FIG. 11 is a conceptual diagram illustrating an example of redundant intent resolution, in accordance with the techniques of the disclosure. Stateful intent analysis engine 432 may be configured to perform conflict resolution. For example, stateful intent analysis engine 432 may determine a resolution such that site specific intents take precedence over the global intents. For instance, stateful intent analysis engine 432 may place site specific intent above the global intent. In the example of FIG. 11, a marketing vertex 542 and a salesforce vertex 544 connected by an allow arc would be above (e.g., level 0) an all vertex 546 and an Internet vertex 548 connected by an allow arc (e.g., level 1). As such, stateful intent analysis engine 432 may place site specific intent (e.g., marketing vertex 542 and salesforce vertex 544) above the global intent (e.g., all vertex 546 and an Internet vertex 548).

Stateful intent analysis engine 432 may validate intent on direct policy changes or out-of-band (OOB) changes. Administrators can modify policies directly on the network devices. This might be done, when controller device 410 is down. Stateful intent analysis engine 432 may validate direct polity changes or OOB changes with intents as follows. Stateful intent analysis engine 432 may generate the intent from the OOB changes. Stateful intent analysis engine 432 may generate a logical Packet from the intent change through an intent policy function. Stateful intent analysis engine 432, with an intent analysis handler, may detect if the change is conflicting with existing intents. For example, stateful intent analysis engine 432 may apply a firewall analysis handler to determine a source EPG (Src EPG) and a destination EPG from the modified intent. Stateful intent analysis engine 432 may find ancestor edges by traversing the SRC node tree and the destination node tree recursively in a parent direction. Stateful intent analysis engine 432 may determine if there is an edge between the SRC node tree and the DST node tree. Stateful intent analysis engine 432 may determine if the edge type is dependent on the given intent type. If the edge type is dependent on the given intent type (e.g., if yes) and if the intent is shadowed, then stateful intent analysis engine 432 may determine that the intent is invalid and notifies the user. In response to determining that the intent is invalid, stateful intent analysis engine 432 may remove the intent as redundant.

Stateful intent analysis engine 432 may realize stateful intents. When stateful intents are being realized, stateful intent analysis engine 432 may account for existing intents. Stateful intent analysis engine 432 may represent all intents as graph vertices. Stateful intent analysis engine 432 may order the intents by intent types if the multiple intents are possible on the site objects. For example, stateful intent analysis engine 432 may order NAT intent to be realized before a firewall intent (e.g., allow or deny). A source endpoint and a destination endpoint may comprise a server, a VM, a client device, a network, a subnet, or an end-user.

Whenever a new intent is created or updated, stateful intent analysis engine 432 may form the logical packet from the intent. For example, for a NAT Intent: NAT Address 1 to Address 2. Logical Packet: {Action: IP Translate, Src: Address2}, stateful intent analysis engine 432 may apply a transition function that results in the updated packet: Logical Packet: {Action: IP Translate, Src: Address2, properties: {OldSrc:Address1}}. Based on the intent dependencies (e.g., Action or intent type), stateful intent analysis engine 432 may determine the dependent intents. Again, an analysis handler would be registered for the intent. Stateful intent analysis engine 432 may determine if the intent change are conflicting with any dependent intent. If the intent change are conflicting with any dependent intent (e.g., if yes), stateful intent analysis engine 432 may provide the resolution. Again, the resolution may order the modified intent or change the current intent. Stateful intent analysis engine 432 may append a "ChangeList" to the packet indicating the resolution. For example, stateful intent analysis engine 432 may append the ChangeList to include {Action: IP Translate, Src: Address2, properties: {OldSrc:Address1,ChangeList:[Intent type: FirewallIntent, uuid: 1234, changes]}}.

Stateful intent analysis engine 432 may validate intents on discovery. There could be intents on discovery that are shadowed, because the device rules are misplaced or the intents on discovery are invalid. Stateful intent analysis engine 432 may generate the intent from discovered devices. Stateful intent analysis engine 432 may generate a logical packet from the intent change through an intent policy function. Stateful intent analysis engine 432 may apply an intent analysis handler to detect if the intent is conflicting with existing intents. Stateful intent analysis engine 432 may apply a firewall analysis handler to determine a source EPG (Src EPG) and destination EPG (DST EPG) from the modified intent. Stateful intent analysis engine 432 may find the ancestor edges by traversing the SRC node tree and destination node tree recursively in a children direction. Stateful intent analysis engine 432 may determine if there is an edge between the SRC node tree and the DST node tree. Stateful intent analysis engine 432 may determine if the edge type is dependent on the given intent type. If the edge type is dependent on the given intent type (e.g., if yes) and if the intent is shadowed, then stateful intent analysis engine 432 may determine that the intent is invalid and notifies the user. In response to determining that the intent is invalid, stateful intent analysis engine 432 may remove the intent as redundant.

Controller device 410 (e.g., stateful intent analysis engine 432) may be extensible. For example, controller device 410 may be configured to define a new intent, a new intent policy function, and/or a new intent analysis handler. The logical packet may be extensible to support detecting conflicts. For example, quality of service (QoS) is a property that may be used to detect the conflict. In this example, stateful intent analysis engine 432 may generate the logical packet to include the following.

Action: Connect/Allow/Block
Src: Site A,
Destination: Site B,
QOS: 10 MBPS
properties:

Techniques described herein may provide one or more of the following:

An approach to detect the intent policy conflicts across the Firewall Intents in real time.

An approach to detect the intent policy conflicts across the heterogeneous intent types in real time.

An approach to provide the resolution, when the conflicts are observed.

An approach to validate the intent on direct policy changes or OOB changes.

An approach to validate the intents on discovery from Brownfield deployments.

An approach to be extensible that allows adding new intent types.

Figure 12:
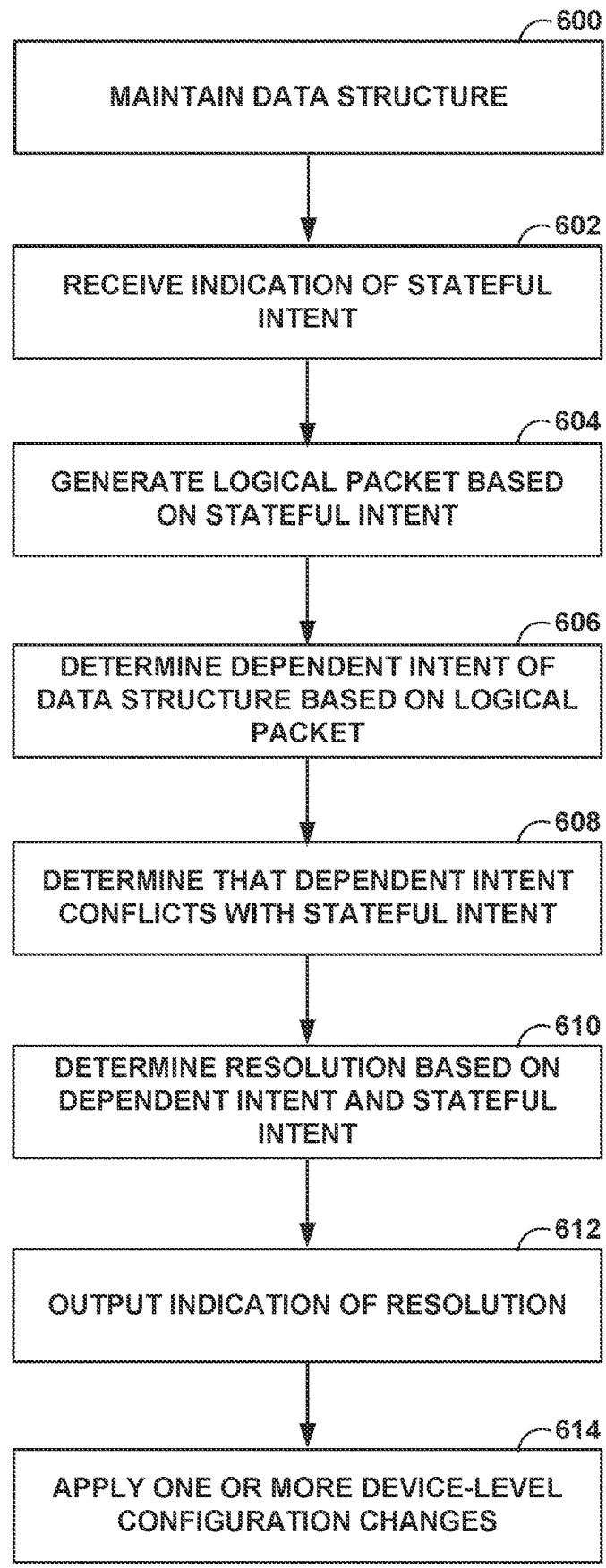
FIG. 12 is a flow chart illustrating an example process for determining a resolution to an intent conflict, in accordance with the techniques of the disclosure.

FIG. 12 is a flow chart illustrating an example process for determining a resolution to an intent conflict, in accordance with the techniques of the disclosure. FIG. 12 is discussed with reference to FIGS. 1-11 for example purposes only.

A controller device (e.g., controller device 10, controller device 210, controller device 410, or stateful intent analysis engine 432) may maintain a data structure (600). In some examples, the data structure includes a plurality of vertices and a plurality of edges, each vertex of the plurality of vertices representing a respective network device of a plurality of network devices (e.g., network devices 12) or a respective stateless intent of a plurality of stateless intents, and the plurality of edges defining relationships between the plurality of vertices. For example, the data structure may be a unified graph model (e.g., see FIGS. 3, 5).

The controller device may receive an indication of a stateful intent (602). For example, the controller device may receive the indication of the stateful intent from a command line interface (CLI). In some examples, the controller device may receive the indication of the stateful intent in response to discovering a network device of the plurality of network devices.

The stateful intent may specify an intended state to be translated into one or more device-level configuration changes for network devices 14. For example, the stateful intent may comprise a NAT intent, firewall intent (e.g., allow or deny), or a connectivity intent (e.g., a VPN, a P2P, a VLAN, or an SD-WAN).

A controller device (e.g., controller device 10, controller device 210, controller device 410, or stateful intent analysis engine 432) may generate a logical packet based on the stateful intent (604). For example, the controller device may generate the logical packet from the intent change through an intent policy function (e.g., function firewall-intent-policy or function nat-intent-policy) for a vertex in the data structure.

A controller device (e.g., controller device 10, controller device 210, controller device 410, or stateful intent analysis engine 432) may determine a dependent intent of the data structure based on the logical packet (606). For example, the controller device may determine an intent type dependency based on the stateful intent. For instance, the controller device may determine the intent type dependency is firewall-allow for a NAT intent using the data structure. The controller device may determine, based on a traversal of the logical packet in the data structure, a vertex of the plurality of vertices that comprises the intent type dependency. In this example, the controller device 10 may determine the dependent intent from the vertex of the plurality of vertices that comprises the intent type dependency. For instance, the controller device may determine one or more ancestor vertices that comprise the intent type firewall-allow.

A controller device (e.g., controller device 10, controller device 210, controller device 410, or stateful intent analysis engine 432) may determine that the dependent intent conflicts with the stateful intent (608). For example, the controller device may determine that the dependent intent comprises configuring a firewall to allow traffic to the first network address and the stateful intent comprises a network address translation that translates a first network address into a second network address. In some examples, the controller device may determine whether a stateful intent and a dependent intent conflict where the stateful intent comprises a first intent type of a plurality of intent types and the dependent intent comprises a second intent type of the plurality of intent types different from the first intent type conflict. In some examples, the controller device may determine whether a stateful intent and a dependent intent conflict where the stateful intent comprises a first intent type and the dependent intent comprises the first intent type. Examples of intent types may include, for example, a network address translate type, a firewall allow type, and a firewall deny type.

In response to determining that the dependent intent conflicts with the stateful intent, a controller device (e.g., controller device 10, controller device 210, controller device 410, or stateful intent analysis engine 432) may determine a resolution that resolves the conflict between the dependent intent and the stateful intent based on the dependent intent and the stateful intent (610).

For example, the controller device may determine a modified stateful intent based on the dependent intent and the stateful intent such that the modified stateful intent does not conflict with the dependent intent. For instance, in response to determining that a firewall-allow for a particular address conflicts with a dependent intent that comprises a NAT for changing a network device from the particular network address to a new network address, the controller device may determine a modified firewall-allow for the new network address instead of the particular network address. In some examples, the controller device may determine a modified dependent intent based on the dependent intent and the stateful intent such that the modified dependent intent does not conflict with the stateful intent. For instance, in response to determining that a dependent intent comprising a firewall-allow for a particular address conflicts with a NAT intent to change a network device from the particular network address to a new network address, the controller device may determine a modified firewall-allow for the new network address instead of the particular network address. In some examples, the controller device may change an order of the intents. For example, the controller device may apply a NAT intent before applying a firewall allow intent or deny intent.

In some examples, the controller device may determine a hierarchical order to apply the dependent intent and the stateful intent. For example, the controller device may determine that the dependent intent applies to a group. In this example, the controller device may determine that the stateful intent applies to a subset of the group that includes not all of the group. In this example, the controller device may apply the stateful intent to the subset of the group and refrain from applying the dependent intent to the subset of the group in response to determining that the dependent intent conflicts with the stateful intent and in response to determining that the stateful intent applies to the subset of the group and the dependent intent applies to the group.

In some examples, the controller device may determine that the dependent intent applies globally to a plurality of sites. In this example, the controller device may determine that the stateful intent applies to a subset of the plurality of sites that does not include all of the plurality of sites. In this example, the controller device may apply the stateful intent to the subset of the plurality of sites and refraining from applying the dependent intent to the subset of the plurality of sites in response to determining that dependent intent conflicts with the stateful intent and in response to determining that the stateful intent applies to the subset of the plurality of sites and the dependent intent applies globally.

A controller device (e.g., controller device 10, controller device 210, controller device 410, or stateful intent analysis engine 432) may output an indication of the resolution (612). For example, the controller device may append a change list for the logical packet. For instance, the controller device may append "{Action: IP Translate, Src: Address2, properties: {OldSrc:Address1,ChangeList:[Intent type: FirewallIntent, uuid: 1234, changes]}}" to the change list.

A controller device (e.g., controller device 10, controller device 210, controller device 410, or stateful intent analysis engine 432) may apply one or more device-level configuration changes (614). For example, the controller device may determine one or more device-level configuration changes based on the dependent intent and the stateful intent. In this example, the controller device may apply the one or more device-level configuration changes to at least one network device of network devices 14. For instance, the controller device may determine the one or more device-level configuration changes using the dependent intent and a modified stateful intent or using a modified dependent intent and the stateful intent. In response, however, to determining that the dependent intent does not conflict with the stateful intent the controller device may determine the one or more device-level configuration changes using the dependent intent and the stateful intent.

In some examples, the controller device may determine that the stateful intent is redundant with the dependent intent and append a change list for the logical packet to indicate that the stateful intent is redundant.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    generating, by a controller device, a logical packet based on a stateful intent;
    determining, by the controller device, a dependent intent of a data structure based on the logical packet, wherein the data structure includes a plurality of vertices and a plurality of edges, each vertex of the plurality of vertices representing a respective network device of a plurality of network devices or a respective stateless intent of a plurality of stateless intents, and the plurality of edges defining relationships between the plurality of vertices; and
    in response to determining that the dependent intent conflicts with the stateful intent, outputting, by the controller device, an indication of a resolution that resolves the conflict between the dependent intent and the stateful intent.

2. The method of claim 1, wherein the stateful intent specifies an intended state to be translated into one or more device-level configuration changes for the plurality of network devices.

3. The method of claim 1, further comprising determining, by the controller device, the resolution that resolves the conflict between the dependent intent and the stateful intent based on the dependent intent and the stateful intent.

4. The method of claim 3, wherein determining the resolution comprises determining one or more device-level configuration changes based on the dependent intent and the stateful intent, the method further comprising:
    applying, by the controller device, the one or more device-level configuration changes to at least one network device of the plurality of network devices.

5. The method of claim 3, wherein determining the resolution comprises determining a modified stateful intent based on the dependent intent and the stateful intent such that the modified stateful intent does not conflict with the dependent intent.

6. The method of claim 3, wherein determining the resolution comprises determining a modified dependent intent based on the dependent intent and the stateful intent such that the modified dependent intent does not conflict with the stateful intent.

7. The method of claim 3, wherein determining the resolution comprises determining a hierarchical order to apply the dependent intent and the stateful intent.

8. The method of claim 7, wherein determining the hierarchical order comprises:
    determining that the dependent intent applies to a group;
    determining that the stateful intent applies to a subset of the group that includes not all of the group; and
    applying the stateful intent to the subset of the group and refraining from applying the dependent intent to the subset of the group in response to determining that the dependent intent conflicts with the stateful intent and in response to determining that the stateful intent applies to the subset of the group and the dependent intent applies to the group.

9. The method of claim 7, wherein determining the hierarchical order comprises:
    determining that the dependent intent applies globally to a plurality of sites;
    determining that the stateful intent applies to a subset of the plurality of sites that does not include all of the plurality of sites; and
    applying the stateful intent to the subset of the plurality of sites and refraining from applying the dependent intent to the subset of the plurality of sites in response to determining that dependent intent conflicts with the stateful intent and in response to determining that the stateful intent applies to the subset of the plurality of sites and the dependent intent applies globally to the plurality of sites.

10. The method of claim 3,
    wherein determining the resolution comprises determining that the stateful intent is redundant with the dependent intent; and
    wherein outputting the indication of the resolution comprises appending a change list for the logical packet to indicate that the stateful intent is redundant.

11. The method of claim 3, wherein the stateful intent comprises a network address translation that translates a first network address into a second network address;
    wherein the dependent intent comprises configuring a firewall to allow traffic to the first network address; and
    wherein determining the resolution comprises modifying the dependent intent to configure the firewall to allow traffic to the second network address and refrain from configuring the firewall to allow traffic to the first network address.

12. The method of claim 1, wherein determining the dependent intent of the data structure comprises:
    determining an intent-type dependency based on the stateful intent;
    determining, based on a traversal of the logical packet, a vertex of the plurality of vertices that comprises the intent-type dependency; and
    determining the dependent intent from the vertex of the plurality of vertices that comprises the intent-type dependency.

13. The method of claim 1, wherein outputting the indication of the resolution comprises appending a change list for the logical packet.

14. The method of claim 1, wherein the stateful intent comprises a first intent type of a plurality of intent types and the dependent intent comprises a second intent type of the plurality of intent types different from the first intent type.

15. The method of claim 14, wherein the plurality of intent types comprises:
a network address translate type;
a firewall allow type; and
a firewall deny type.

16. The method of claim 1, wherein the stateful intent comprises a first intent type and the dependent intent comprises the first intent type.

17. The method of claim 1, further comprising receiving the indication of the stateful intent from a command line interface (CLI).

18. The method of claim 1, further comprising receiving the indication of the stateful intent in response to discovering a network device of the plurality of network devices.

19. A device configured to manage a plurality of network devices, the device comprising:
memory; and
processing circuitry coupled to the memory, wherein the processing circuitry is configured to:
generate a logical packet based on a stateful intent;
determine a dependent intent of a data structure based on the logical packet, wherein the data structure includes a plurality of vertices and a plurality of edges, each vertex of the plurality of vertices representing a respective network device of a plurality of network devices or a respective stateless intent of a plurality of stateless intents, and the plurality of edges defining relationships between the plurality of vertices; and
in response to a determination that the dependent intent conflicts with the stateful intent, output an indication of a resolution that resolves the conflict between the dependent intent and the stateful intent.

20. A non-transitory computer-readable storage medium comprising one or more instructions that cause processing circuitry to:
generate a logical packet based on a stateful intent;
determine a dependent intent of a data structure based on the logical packet, wherein the data structure includes a plurality of vertices and a plurality of edges, each vertex of the plurality of vertices representing a respective network device of a plurality of network devices or a respective stateless intent of a plurality of stateless intents, and the plurality of edges defining relationships between the plurality of vertices; and
in response to a determination that the dependent intent conflicts with the stateful intent, output an indication of a resolution that resolves the conflict between the dependent intent and the stateful intent.

* * * * *